(12) United States Patent
Heikkinen et al.

(10) Patent No.: US 12,160,322 B2
(45) Date of Patent: Dec. 3, 2024

(54) SYSTEM AND METHOD FOR RETRIEVING MISSING MULTICAST OR BROADCAST MEDIA SEGMENTS USING D2D COMMUNICATION

(71) Applicant: Adeia Guides Inc., San Jose, CA (US)

(72) Inventors: Antti Heikkinen, Oulu (FI); Mikko Uitto, Tyrnävä (FI); Reda Harb, Issaquah, WA (US); Dhananjay Lal, Englewood, CO (US)

(73) Assignee: Adeia Guides, Inc., San Jose, CA (US)

( * ) Notice: Subject to any disclaimer, the term of this patent is extended or adjusted under 35 U.S.C. 154(b) by 0 days.

(21) Appl. No.: 18/129,244

(22) Filed: Mar. 31, 2023

(65) Prior Publication Data
US 2024/0333545 A1     Oct. 3, 2024

(51) Int. Cl.
*H04L 29/06*        (2006.01)
*H04L 12/18*        (2006.01)
*H04N 21/6405*      (2011.01)
*H04N 21/845*       (2011.01)

(52) U.S. Cl.
CPC ........ *H04L 12/185* (2013.01); *H04L 12/1868* (2013.01); *H04N 21/6405* (2013.01); *H04N 21/8455* (2013.01)

(58) Field of Classification Search
None
See application file for complete search history.

(56) References Cited

U.S. PATENT DOCUMENTS

| | | | | |
|---|---|---|---|---|
| 9,712,581 B2 * | 7/2017 | Tinsman | .......... | H04N 21/44004 |
| 2003/0142670 A1 * | 7/2003 | Gould | .................. | H04L 69/161 |
| | | | | 370/413 |
| 2007/0286121 A1 * | 12/2007 | Kolakowski | ........ | H04L 65/1101 |
| | | | | 370/328 |
| 2008/0219154 A1 | 9/2008 | Durrey et al. | | |
| 2012/0259994 A1 * | 10/2012 | Gillies | .................. | H04L 12/189 |
| | | | | 709/231 |
| 2014/0229529 A1 * | 8/2014 | Barone | ................. | H04L 65/103 |
| | | | | 709/203 |
| 2017/0311341 A1 * | 10/2017 | Patil | ........................ | H04W 4/06 |
| 2017/0366590 A1 * | 12/2017 | Kazerani | ................. | H04L 65/80 |

(Continued)

FOREIGN PATENT DOCUMENTS

| | | | | |
|---|---|---|---|---|
| CN | 101536416 B | 9/2012 | | |
| DE | 60129328 T2 * | 3/2008 | ......... | H04L 12/1836 |
| WO | 2022159686 A1 | 7/2022 | | |

OTHER PUBLICATIONS

"5G: Media Streaming (5GMS); General description and architecture," 3GPP TS 26.501 V17.2.0, Technical Specification Group Services and System Aspects, Release 17 (15 pages) (2022).

(Continued)

*Primary Examiner* — Christopher B Robinson
(74) *Attorney, Agent, or Firm* — Haley Guiliano LLP

(57) ABSTRACT

Systems and methods for establishing a primary multicast for media content and a supplemental multicast for dropped segments of the media content are provided. A primary multicast is used to transmit segments of media content to a plurality of devices. One or more of the devices can then act as a source of a supplemental multicast, to provide segments of the media content to other devices in the event those devices fail to properly receive a segment via the primary multicast.

20 Claims, 11 Drawing Sheets

(56) References Cited

U.S. PATENT DOCUMENTS

| | | | |
|---|---|---|---|
| 2019/0238899 A1* | 8/2019 | Jimenez | H04N 21/6405 |
| 2019/0281516 A1* | 9/2019 | Viox | H04W 36/026 |
| 2019/0349629 A1* | 11/2019 | Stockhammer | H04N 21/26258 |
| 2020/0059683 A1* | 2/2020 | Grigsby | H04N 21/6408 |
| 2020/0100048 A1* | 3/2020 | Wu | H04W 72/20 |
| 2021/0105522 A1* | 4/2021 | Grigore | H04N 21/43079 |
| 2021/0136437 A1* | 5/2021 | Loh | H04N 21/6405 |
| 2023/0098668 A1* | 3/2023 | Pichaimurthy | H04N 21/2393 725/148 |

OTHER PUBLICATIONS

"5G; NR; NR and NG-RAN Overall Description; Stage-2," 3GPP TS 138.300 V17.0.0 : 3rd Generation Partnership Project; Technical Specification Group Radio Access Network, Release 17 (207 pages) (2022).

"Digital Video Broadcasting (DVB); Adaptive media streaming over IP multicast," version 1.1.1, ETSI TS 103 769 109 pages) (2020).

"Technical Specification Group Services and System Aspects; Architectural enhancements for 5G multicast-broadcast services; Stage 2," 3GPP TS 23.247 V17.3.0: 3rd Generation Partnership Project, Release 17 (15 pages) (2022).

"Technical Specification Proximity based Services (ProSe) in the 5G System (5GS)," 3GPP TS 23.304 version 17.3.0 (Jul. 2022) 3rd Generation Partnership Project (15 pages) (2022).

"Technical Specification, Group Services and System Aspects; Multimedia Broadcast/Multicast Service (MBMS); Protocols and codecs," 3GPP TS 126.347 V17.1.0, 3rd Generation Partnership Project (145 pages) (2022).

"ATSC Standard: Signaling, Delivery, Synchronization, and Error Protection," ATSC.org [retrieved on May 1, 2023 from URL https://www.atsc.org/atsc-documents/3312017-signaling-delivery-synchronization-error-protection/] (240 pages).

Bouras et al., "AL-FEC for streaming services over LTE systems," Proceedings of the 14th International Symposium on Wireless Personal Multimedia Communications: Communications, Networking and Applications for the Internet of Things (WPMC'11):1-5 (2011).

Lentisco et al., "Seamless Mobile Multimedia Broadcasting Using Adaptive Error Recovery," Mobile Information Systems, 2017:1-12 (2017).

Paila et al., "Flute—file delivery over unidirectional transport," IETF RFC 6726 (46 pages) (2012).

* cited by examiner

SYSTEM AND METHOD FOR RETRIEVING MISSING MULTICAST OR BROADCAST MEDIA SEGMENTS USING D2D COMMUNICATION

BACKGROUND OF THE INVENTION

One or more embodiments of the present disclosure relate to methods and systems for establishing a primary multicast for segments of media content, and establishing a supplemental multicast to retrieve missing segments of media content that were unable to be received via the primary multicast. Some embodiments or aspects may relate to other features, functionalities, or fields.

SUMMARY

In a broadcast or multicast scenario, it may be desirable to transmit a media stream from one source to multiple user devices at the same time. In these situations, the source or transmitter (e.g., a base station or cell tower) may be configured for multicasting or broadcasting the media stream to a large group of devices through IP-based delivery. The transmitter may be configured for multicasting the media stream using a Multimedia Broadcast Multicast System (MBMS) using one or more mobile networks, and/or using American Television Systems Committee (ATSC) 3.0 or Digital Video Broadcasting (DVB) for delivering the media stream in the context of broadcast-based television stream delivery. The receiver devices (e.g., user equipment or UEs) receive, decode, and display the media stream.

When operating in this context, there are several problems that can arise. First, because the multicast/broadcast system is based on a point-to-multipoint connection, there are issues with error correction. Feedback techniques such as retransmissions cannot be used for error correction. In addition, while the use of Forward Error Correction (FEC) is possible, its use can lead to severe overhead and waste of network resources. Additionally, using a unicast channel as a fallback directly from the transmitter or content origin may not be possible due to the inability to establish a direct connection.

Another problem that can arise in this context is that one or more receiving devices may receive corrupted segments of the media content, or may drop one or more segments altogether. Movement of the receiving devices can change the signal characteristics, resulting in reduced performance and corrupted or dropped segments. As a result, the user may experience stalls in playback of the media content, missing frames, and substantial quality fluctuations. The user device's quality of experience (QoE) may be negatively affected. Additionally, where FEC is used to obtain more reliability for the stream, the high overhead may reduce the overall performance and the user's QoE.

Furthermore, from the perspective of the transmitter, the output power must be changed to accommodate the farthest receiver device or the receiver device with the weakest signal that are within the transmitter's service area. This may result in unnecessary bandwidth and energy consumption if MBMS resource allocation or transmit power is oversized.

These problems and others are addressed by one or more embodiments of the present disclosure. In an embodiment, a device receiving the primary multicast via a first network may establishes a secondary or supplemental unicast or multicast via a second, different network, from which a user device can retrieve segments originally transmitted via the primary multicast that were corrupted or dropped. For example, the first network may be a mobile network (wherein the primary multicast is transmitted by a base station), and the second network may be a 5G sidelink connection between two user devices. Other networks may include any suitable wireless or wired network which enables communication between devices, either with or without one or more intermediate devices. The secondary multicast may include making a connection between devices using a sidelink (SL) or device to device (D2D) connection. The system adds information to the User Service Bundle Description (USBD) or to a manifest file transmitted to one more user devices, which enables the user devices to communicate using proximity based services (ProSe). In one example, supplemental metadata in the USBD or manifest file consists of a ranked list of user devices or their addresses that can be used to retrieve missing segments.

In some examples, user devices include a Media Handler Unit (MHU) which may replace the HTTP proxy in the MBMS (Multimedia Broadcast Multicast System) Unit of the user device. The MHU may use sidelink or D2D proximity services to discover and communicate with other user devices nearby. The MHU may also detect missing media segments or partial segments from a segmented media stream from the primary multicast or broadcast transmission, and may request the missing segments from another user device.

The MHU may enable a first user device to parse second user device information from a USBD or manifest file (e.g., the second user device ID, local proxy public address, or Base URL), use SL or D2D proximity services to discover the second user device nearby and communicate with the second user device. Where the first and the second user devices receive the same transmission via the primary multicast, they can cooperate and transmit segments to each other if either device drops a segment or needs to retrieve any missing segments of the media content.

In some examples, a first user device can fetch a missing segment from a second user device's local media server (local proxy) via SL or D2D services if the missing segment is not available at the first user device's local media server. The MHU in the first user device may reconfigure the local proxy by adding the local proxy public address of the second user device. The first user device can then access the local proxy public address of the second user device to retrieve the missing segment. The second user device can also reconfigure its local proxy by adding the local proxy public address of the first user device, so that the second user device can access missing segments stored by the local proxy of the first user device.

An example system and method for enabling a device that is part of a primary multicast to retrieve corrupted or missing segments from another device that is part of the primary multicast proceeds as follows. A first user device and a second user device join a primary multicast stream of media content by connecting to a transmitter (e.g., a base station such as an eNB or gNB) which is multicasting the stream of media content. The transmitter determines that the first and second user devices are in proximity to each other, and the transmitter adds first and second user device information to the manifest file or USBD metadata that is delivered in a User Service Announcement to the first and second user devices via the primary multicast, or when the manifest file updates with the media segments.

The first and second user devices are located close to each other, enabling them to establish a sidelink or D2D connection. The first and second user devices may use sidelink proximity services to communicate with one another at high data rates (e.g., higher than the primary multicast data rate), using the information received from the USBD and/or manifest file. The user devices may inform each other about their respective Media Handler Unit URLs (Uniform Resource Identifier), and enable each other to request media segments using the sidelink or D2D connection if transmission problems in the primary multicast result in a missing media segment at either the first or second user device.

The first and second user devices receive a manifest file from the content server through the primary multicast delivery. Media segments listed in the manifest file are delivered to the user devices via the MBMS. The MHU in each of the first and second user devices stores the media segments to the local cache for a predefined duration, and the media player of each user device retrieves the media segments from the MHU's local proxy according to the availability time described in the manifest file or MPD. In the case where a media segment transmitted via the MBMS service is not received by the MBMS Unit in the first user device, or if the media segment cannot be repaired, the MHU of the first user device may request the media segment, or ranges of it, from the second user device MHU via the sidelink or D2D connection. If the MHU in the first user device receives the media segment from the second user device, the first user device adds the segment to the local cache and delivers the segment to the media player of the first user device. The first user device can thereby maintain a properly filled buffer and present the media content to the user without interruption, by taking advantage of both the primary multicast, and, where the primary multicast fails to provide a given segment, storage of the segment by one or more other user devices in proximity to the first user device.

In some examples, the supplemental multicast may be used to transmit only certain portions of segments of the media content. For example, only the I-frames of the content, or only the P- or B-frames. In these cases, a first user device may be joined to a primary multicast to attempt to receive all of the segments of the multicast. However, when the first user device drops as segment, a second user device may transmit the I-frames of the dropped segment via a supplemental multicast to the first user device. Additionally, in some examples, a third user device may transmit the P- or B-frames of the dropped segment via an optional second supplemental multicast to the first user device. The first user device may there for be joined to the primary multicast, and two separate supplemental multicasts used to receive separate portions of any segments dropped over the primary multicast.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
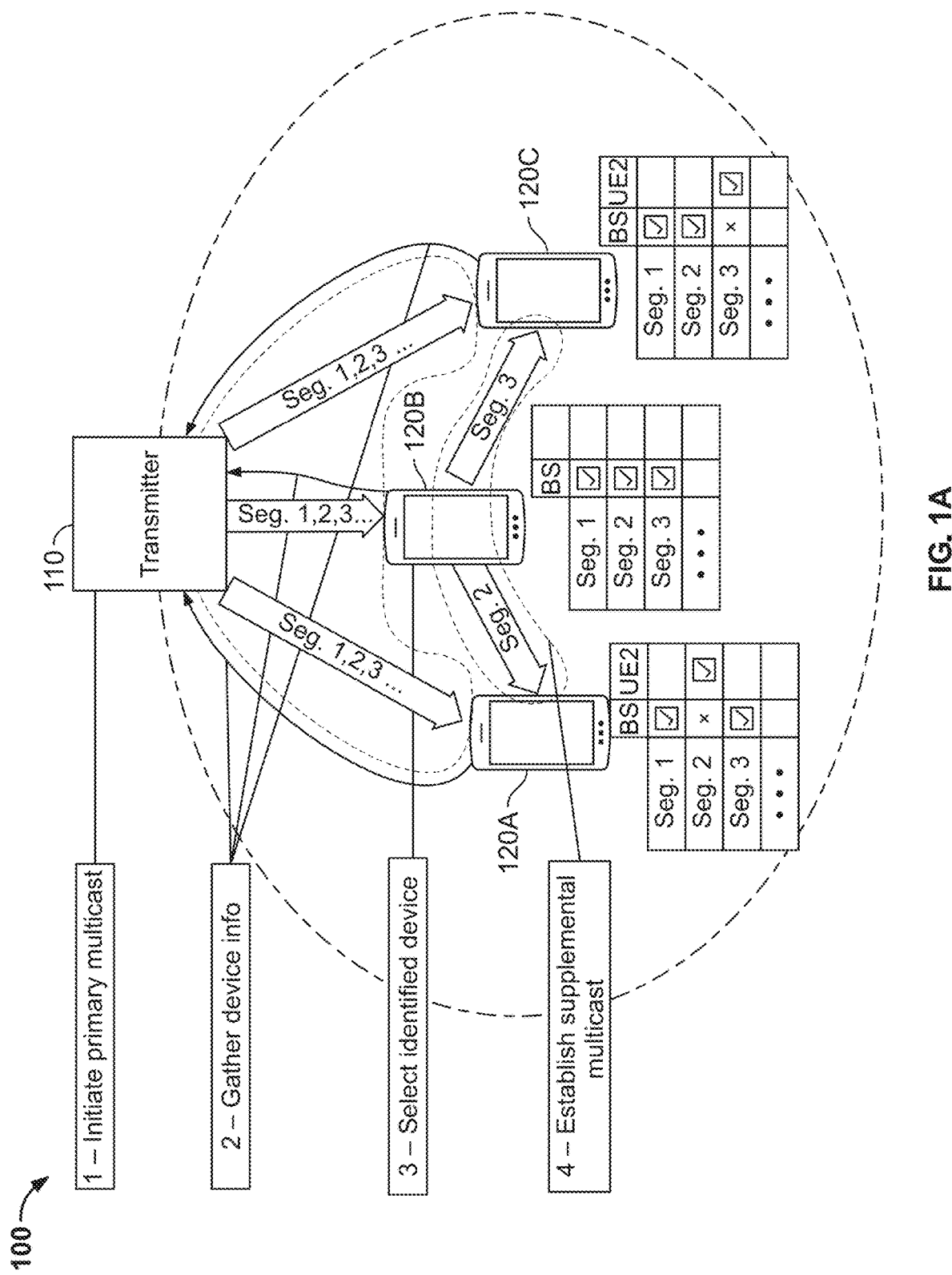
FIG. 1A shows an example simplified block diagram of a system enabling the various functions and benefits described herein, in accordance with some embodiments of this disclosure.

Methods and systems are provided herein for establishing a primary multicast for segments of media content, and establishing a supplemental multicast to retrieve missing segments of media content that were unable to be received via the primary multicast.

As noted above, there are several techniques that enable point-to-multipoint media content broadcasting and multicasting. ATSC 3.0 is an IP-based broadcasting standard for TV broadcast delivery. It is designed to transmit high-quality interactive TV broadcasts to both fixed and mobile devices. ATSC 3.0 uses Real-Time Object Delivery over Unidirectional Transport (ROUTE) and MPEG Dynamic Adaptive Streaming over HTTP (MPEG-DASH) for both broadcast and broadband delivery of media data. In addition, Digital Video Broadcasting (DVB) specifies a profile of ATSC-ROUTE in DVB Adaptive Media Streaming over IP Multicast. Multimedia Broadcast Multicast System (MBMS) is a point-to-multipoint specification introduced in the 3G/4G context. LTE 3GPP proposes to use evolved multimedia broadcast multicast system (eMBMS) to send, over a common channel, a single copy of the multimedia segments to all the terminal clients connected to the eMBMS service. Thus, multimedia segments, coded at a bitrate that fits the available bandwidth of the eMBMS channel, are encapsulated and sent over eMBMS using the file delivery over Unidirectional Transport (FLUTE) protocol. FLUTE, which may be particularly suited to multicast networks, works on top of User Datagram Protocol (UDP) and can be used together with Application Layer Forward Error Correction (AL-FEC) techniques to improve the reliability of data transmission over eMBMS. 5G NR (New Radio)/5GC (5G Core) introduces Multicast and Broadcast Services (MBS) starting from Release 17 and is a continuation for eMBMS and further eMBMS (FeMBMS) introduced in LTE. 5G Media Action Group (5G-MAG) is driving the importance of MBS in mobile media streaming and towards more service-oriented architecture from Release 17.

However, even when using AL-FEC techniques, a high Packet Error Rate (PER) can result in segments being lost in the multicast channel. In that case, HTTP may be used as a unicast recovery mechanism to retrieve the lost segments. In one example, a mechanism allows selecting alternative representations of the media content in case there are segments that need to be recovered via HTTP. The mechanism is based on a DASH proxy located close to the base station. A representation of the media content is selected by taking into account the bandwidth allocated to the terminal recovering the lost segment. For instance, the representation of the missing segment may be a lower resolution than the segment originally transmitted. This is because when a segment is lost and then retrieved via HTTP, the available bandwidth in the unicast channel can be lower than the bitrate of the representation sent over eMBMS. Therefore, the multimedia playback could stall if the delay introduced by the unicast retransmission of the segment is so long that the segment cannot be retrieved before the buffer is emptied. Simply stated, this technique reduces the unicast recovery delay by switching to lower quality representations during the recovery of lost segments.

HTTP Adaptive streaming (HAS) can be used in consumer video service distribution both in live as well as video on demand (VOD) streaming. In HAS, the media stream is divided into a sequence of short media segments and delivered to the client using HTTP and common Web servers. HTTP Live Streaming (HLS) is a widely used HAS protocol developed by Apple. Dynamic Adaptive Streaming over HTTP (MPEG-DASH) provides a standardized solution for HAS. MPEG-DASH includes two main parts: media presentation description (MPD) and the definition of the content format in terms of media segments. In some examples, the MPD may also be referred to herein as a manifest file and may contain a structured collection of the media content in XML format. Each media segment duration is typically two to ten seconds, and is encoded at multiple quality levels to allow adaptation against network fluctuations (e.g., lower quality is used when the connection is weak or has low bandwidth, and higher quality when the connection is good or has high bandwidth). HLS functions in a similar segment-based way, but the manifest structure and usage, especially for live streaming, may be different from that mentioned above because for live streaming the manifest needs to be updated. Master and child manifest files may be used for altering representations of the same video stream. MPEG-DASH has been adopted by the 3rd Generation Partnership Project (3GPP) for use in mobile networks and eMBMS, and allows for the delivery of DASH segments and MPDs as defined in 3GPP TS 26.346. In addition, the eMBMS media streaming service supports HLS content as defined in 3GPP TS 26.346. In addition, the ROUTE protocol in ATSC 3.0 supports the delivery of MEPG-DASH or HLS segments.

MBMS can provide a synchronized stream inside a Multimedia Broadcast multicast service Single Frequency Network (MBSFN) area, where a mobile network base station can belong to multiple MBSFN areas. MBMS architecture in the mobile networking core may require MBMS-GW (gateway) and BM-SC (Broadcast Multicast Service Center) components. MBMS-GW interconnects to the base station via MME (Mobile Management Entity) and MCE (Multi-cell/Multicast Coordination Entity) components and is in charge of control signaling of the MBMS session. The BM-SC is responsible for putting multimedia content into the network, which may include taking the media stream input from the content provider. As an example, one media stream input is HAS (i.e., DASH or HLS using media content in segmented form). The MBMS client in each user device or user equipment (e.g., UE) includes an HTTP proxy, which translates the received multicast stream back to media segments that the HAS media player of the UE can request using HTTP. In one example, the MBMS session order comprises session creation, transmission of a service announcement (SA), UE session join and session establishment, data transfer, UE session leave and session release, and MBMS session deletion. It is notable that UEs may join and leave the session in arbitrary fashion, but the data synchronization during the active session time is identical for each of the UEs. The data content between the BM-SC and the UE for an MBMS-based delivery can be optionally protected using FEC coding. But, as noted above, FEC coding can cause severe overhead for the transmitted stream.

In some examples, the ROUTE protocol (i.e., used by ATSC 3.0 for broadcasting) may be run over UDP/IP and may be used for unicast, broadcast, and/or multicast transport. In ATSC 3.0, ROUTE MPEG-DASH segments can be delivered through both ROUTE/UDP/IP and HTTP/TCP/IP. In some examples, native broadcasting services are delivered through ROUTE/UDP/IP and additional multimedia content is delivered through HTTP/TCP/IP. In broadcast delivery, the interface between the delivery system and the DASH player may be based on an HTTP proxy. The DASH Player may request media segments from the HTTP proxy based on the media segment availability start times in the manifest file (i.e., MPD). Media segments are delivered via broadcast by the ROUTE/UDP/IP stack to the cache of the user device, which forwards the segments to the HTTP Proxy.

In some examples, DVB Adaptive Media Streaming over IP Multicast defines a multicast gateway that converts multicast transport objects received from a multicast into playback delivery objects. The multicast gateway may be realized as an HTTP proxy where the DASH player requests media segments using HTTP.

In some examples, for each of the broadcast or multicast methods noted above, the UE may include a receiver unit having an HTTP Proxy (e.g., MBMS unit) that receives the segments from the broadcast or multicast and delivers the segments to the cache of the UE. The media player can access the media segments from the cache using an HTTP request. In some examples of this disclosure, a receiver of the UE may be referred to as an MBMS unit. The MBMS unit in the context of eMBMS may refer to the MBMS client. In the ATSC 3.0 ROUTE context, the MBMS unit may refer to the HTTP proxy. And in the DVB Adaptive Media Streaming over IP Multicast context, the MBMS unit may refer to the Multicast Gateway. Certain MBMS Client functionality is described in the 3GPP Specification.

In each of the techniques described above, the system may include multiple UEs that each receive, decode, and display the primary multicast stream. In addition, a UE may communicate with one or more other UEs directly using Device-to-Device (D2D) or sidelink (SL) communication. In some examples, D2D or SL communication may refer to technology that enables UEs to communicate with each other without traversing a base station or other device. For purposes of this disclosure, D2D and SL communication may be used interchangeably. It should also be understood that other direct communication techniques between UEs, which do not use an intermediate device, may be used as well. SL solutions support unicast, groupcast (multicast), and broadcast communication between devices. In some examples, a base station may assist in establishing a D2D connection and possibly allocating resources to one or more UEs. D2D communication among UEs is becoming more and more important for information exchange in wireless communication systems, and also enabling high-performance networking within a specific area or within groups with low delay. In some examples, D2D communication enables direct communication between proximate devices, for instance multiple UEs, without going through the base station. D2D and/or SL communication may be part of a wireless communication system based on 3GPP Rel-16, Rel-17, or beyond. 5G Advanced (beginning with Release 18) aims to solve many sidelink technology challenges, such as UE discovery, communication initiation, Quality of Service (QOS) requirements and connection security.

With the above noted systems and techniques in mind, some example methods and systems enable retrieval of missing or incorrect segments in a multicast system by detecting multicast data packet loss according to the packet sequence number in the packet header. In these methods and systems, the UEs may use several messages to negotiate which data packets can be recovered from other UEs, and how those data packets can be recovered. Other example methods and systems include a first data link and a second data link, wherein the first data link is compliant with the IEEE802.11 (wireless) standard and the second data link is compliant with the IEEE802.3 (ethernet) standard. If the UE has not received a packet over the first data link (e.g., determined based on the numbering of the packets received), it can request the other devices to send the packet using the second data link.

FIG. 1A illustrates an example simplified block diagram of a system 100 enabling the various functions and benefits described herein. The illustrated system 100 includes a transmitter 110, first UE 120A, second UE 120B, and third UE 120C.

At the beginning of a multicast session, the transmitter 110 begins transmitting media content (e.g., a media stream of a sporting event). In one example, the transmitter 110 is a base station, and the transmitter transmits segments of the media content to the UEs using a mobile network. After the multicast session is initiated, the three UE 120A-C each join the multicast session, intending to receive and display the media content. It should be noted that the UEs may join the multicast from the transmitter 110 at different times from each other. When the UEs 120A-C join the session, they may transmit various device information to the transmitter 110, such as battery life, signal strength, location, and more.

When a UE joins the session, the transmitter 110 sends information about other UEs that are joined to the multicast, as well as various other information. The information relating to the other UEs may indicate the UE locations, battery lives, signal strengths, and/or other information about the UEs. Additionally or alternatively, the information may include a ranked list of UEs, based on the various locations, battery lives, signal strengths, and more. In some examples, the information each UE receives is the same. In other examples, the information is tailored specifically for each UE. That is, UE 120A may receive different information about the UEs that are part of the multicast than UE 120B or 120C. The tailored information may factor in the location, battery life, signal strength, and more of the receiving UE.

Each UE receives the information from the transmitter 110, and may determine a best UE to provide a supplemental multicast, in case there are issues with the primary multicast from the transmitter 110 (e.g., dropped segments, lost connection, etc.). In some examples, the transmitter 110 may determine the best device to provide the supplemental multicast, based on the received device information. In other examples, the devices themselves (with or without assistance from the transmitter 110) may determine the best device to provide the supplemental multicast. The devices may coordinate with each other to determine which device is centrally located with respect to others, which device has the best connection to the transmitter 110 (and thus the least likely to drop segments), and/or any other suitable calculation or comparison to determine the best device to provide the supplemental multicast.

As illustrated in FIG. 1A, the transmitter 110 transmits segments of the media content to the UEs 120A-C. The UEs 120A-C store the received segments in respective local caches (e.g., HTTP proxies). The respective media players of each UE request the stored segments from the local caches to present to the users of the UEs.

As shown in FIG. 1A, the first UE 120A may fail to receive one or more segments of the media content. When the first UE 120A determines that segment-2 has been corrupted, dropped, or not correctly received, and is therefore not accessible by the media player via the local cache of UE 120A, the UE 120A transmits a request to the second UE 120B for the missing segment. The first UE 120A sends a request to the second UE 120B to retrieve segment-2 from UE 120B's local cache. If UE 120B correctly received and stored segment-2, UE 120B then sends segment-2 from its local cache back to UE 120A. UE 120A then stores segment-2 in its local cache, and the media player of UE 120A retrieves and presents segment-2 to the user.

Transmitter 110 continues to transmit segments of the media content to UEs 120A-C, which store received segments in their respective local caches. When a UE determines that a segment has been dropped, a buffer underrun may occur if the missing segment is not retrieved quickly (i.e., before the buffer runs out). By retrieving the missing segment from a local UE via a supplemental multicast (via a SL or D2D connection), the UE can retrieve the missing segment before its buffer runs out.

FIG. 1A also illustrates a third UE 120C. As illustrated in FIG. 1, UE 120C dropped segment-3 from the primary multicast by the transmitter 110. UE 120C then retrieved segment-3 from UE 120B. As such, UE 120B has established a supplemental multicast of the media content, wherein the other proximate devices (120A and 120C) can retrieve segments that were originally transmitted by the transmitter 110 via the primary multicast, but were dropped or corrupted, or otherwise not properly received. In some examples, UE 120C retrieves segment-3 from UE 120B proactively without losing time sending a request to UE 120B and waiting for a response, thereby reducing the likelihood of a buffer underrun.

Figure 1B:
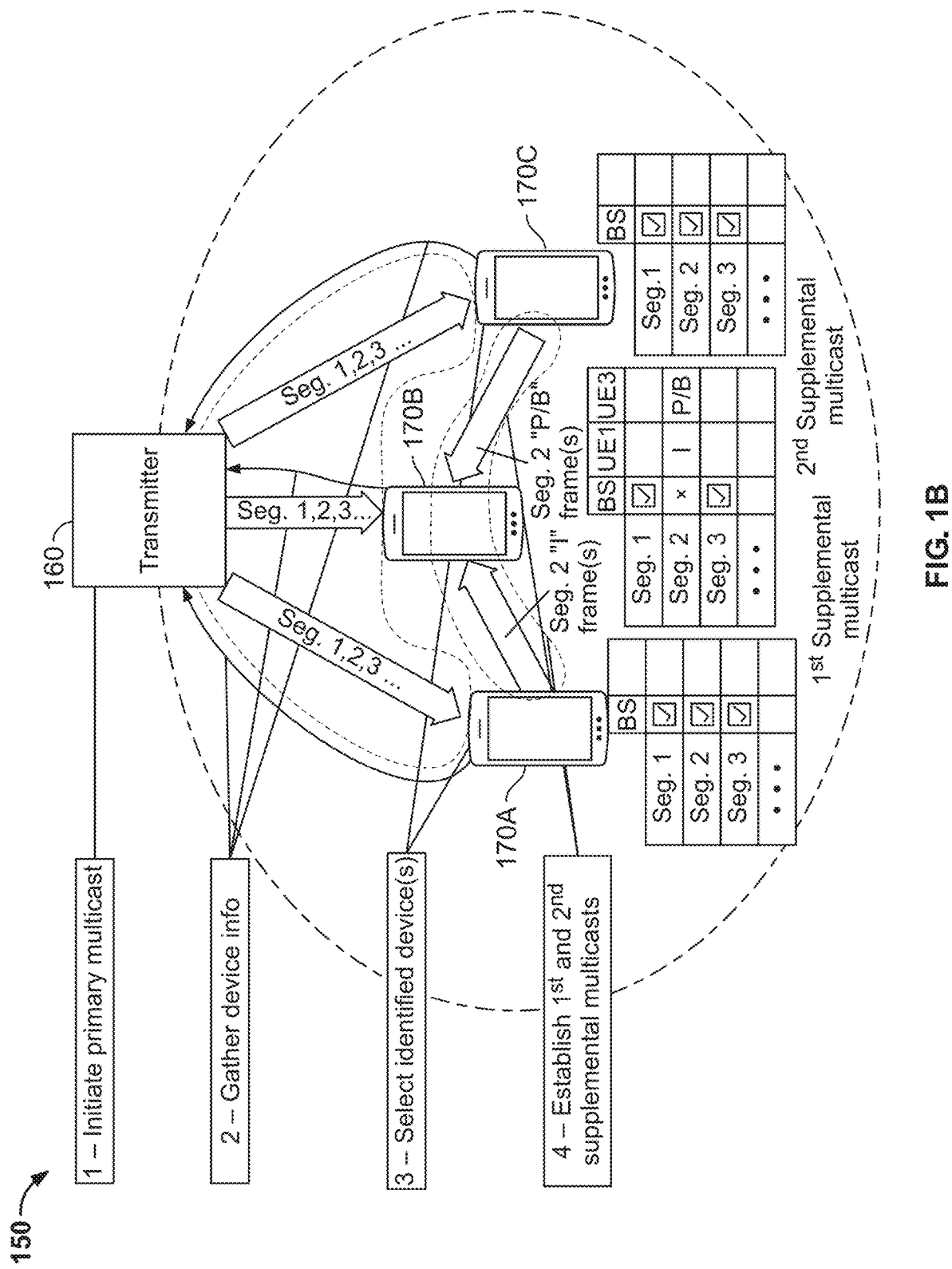
FIG. 1B shows a second example simplified block diagram of a system enabling the various functions and benefits described herein, in accordance with some embodiments of this disclosure.

FIG. 1B illustrates a system 150 similar to system 100 of FIG. 1A, including a transmitter 160 which may be similar or identical to transmitter 110, and first, second and third UEs 170A, 170B, and 170C which may be similar or identical to UEs 120A, 120B, and 120C. In this example, however, UE 170B has failed to correctly receive segment-2 via the primary multicast. UE 170A is identified based on the device information as a best candidate for providing the I-frame portion of segment-2, while UE 170C is identified based on the device information as the best candidate for providing the P- and B-frames of segment-2. As such, UE 170A establishes a first supplemental multicast to provide the I-frames of segment-2 to UE 170B, and UE 170C establishes a second supplemental multicast to provide the P- and B-frames of segment-2 to UE 170B.

Figure 2:
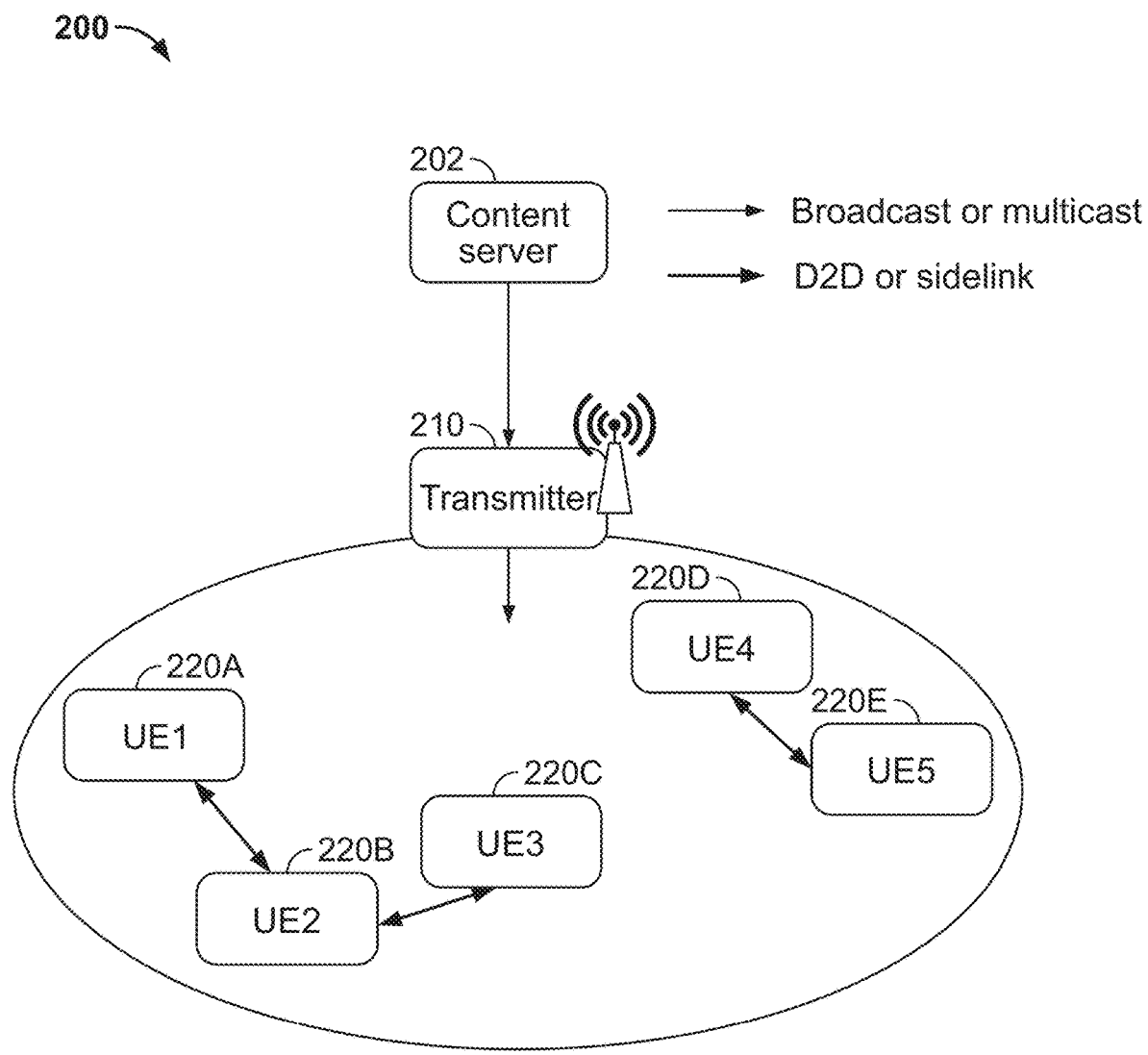
FIG. 2 shows another simplified block diagram of an example system, in accordance with some embodiments of this disclosure.

FIG. 2 shows another simplified block diagram of an example system 200, which may enable one or more devices (UEs) to complement missing multicast or broadcast media segments from another device using a SL and/or D2D connection. System 200 includes a content server 202, a transmitter 210, and UEs 220A-E.

The content server 202 may be any suitable storage of media content, communicatively coupled to the transmitter 210. The transmitter 210 may be a base station (e.g., eNB or gNB) and may be configured to deliver media content from content server 202 via multicast and/or broadcast to the receivers in the UEs 220A-E. The transmitter 210 may broadcast or multicast media content using a mobile network such as LTE or 5G, digital television network based on ATSC 3.0 or DVB, broadband network, or any other suitable network. In some examples, the transmitter 210 may broadcast or multicast segments of the media content using DASH, HLS or CMAF (Common Media Application Format).

In some examples, the framework used for the broadcast and/or multicast includes a user service bundle description (USBD). The USBD may refer to an MPD file that defines the available representations of the media content (i.e., available resolutions, bit rates, etc.). In some examples, the USBD may be modified to include one or more customized fields including information that enables a UE to retrieve missing segments from one more other UEs, as described below.

UEs 220A-E may be phones, tablets, computers, set-top boxes, or any computing device configured to receive a multicast stream of media content, and to make a SL or D2D connection with one or more other UEs. The UEs may include the capability to connect to a primary broadcast or multicast from the transmitter 210, as well as to connect directly to one or more other UEs by D2D or SL and at the same time.

As shown in FIG. 2, in some examples the UEs that are joined to the primary multicast may be grouped in to one or more subgroups. For instance, UEs 220A-C are grouped into a first subgroup and UEs 220D-E are grouped into a second subgroup, based on their respective locations. The information provided by the transmitter to indicate which other UEs are available for a SL or D2D connection, in some cases including a ranked list, may prioritize or weight higher the UEs that are within the same subgroup as each other. That is, the information provided to UE 220A may have UE 220B and 220C ranked higher than UE 220D and UE 220E, based on the proximity of UEs 220A-C to each other. FIG. 2 also illustrates that in some examples, the coverage area of the primary multicast from the transmitter may be larger than the coverage area of the supplemental multicast from one of the UEs (e.g., UE 220B).

Figure 3:
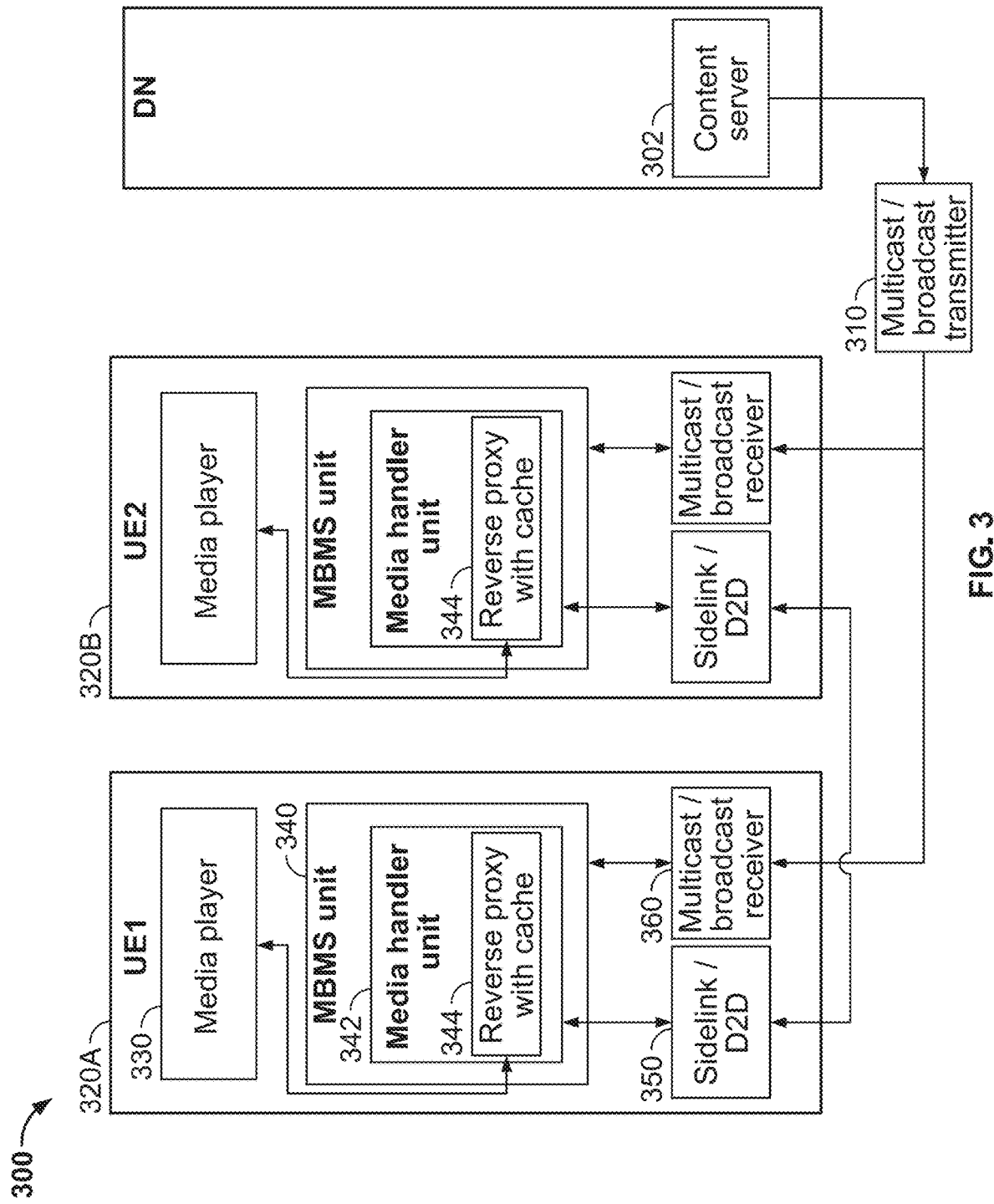
FIG. 3 shows a simplified block diagram of some of the devices of the example system of FIG. 2, in accordance with some embodiments of this disclosure.

FIG. 3 shows a simplified block diagram 300 of some of the devices of the example system of FIG. 2. The diagram 300 includes a content server 302, a transmitter 310, a first UE 320A, and a second UE 320B. The first and second UEs 320A-B may be similar or identical, and for the purpose of simplicity only the first UE 320A will be described in detail.

As noted above, the content server 302 may be configured to store media content and provide the media content to the transmitter 310 for broadcast and/or multicast to one or more UEs, such as UEs 320A-B.

When the UEs 320A-B join the multicast session, the transmitter 310 may gather information about the UEs such as their locations, battery levels, signal strengths, and more.

The UEs may send this information to the transmitter and/or other devices when the UE joins the multicast session, at a regular interval during the multicast session, and/or in response to some trigger (e.g., when the UE moves beyond some threshold distance, changes in battery level by some threshold, change in signal strength beyond some threshold, etc.). The transmitter 310 may update the information and/or ranked list when the UEs join or leave the multicast session, change their locations, or in response to some other trigger.

In some examples, the USBD may include one or more customized fields that provide information to enable a UE to retrieve missing segments from one more other UEs using Proximity based Services (ProSe) such as SL or D2D communication. More specifically, the supplemental metadata in the USBD may consist of a ranked list of UE devices that can be used to retrieve the missing segment. The list can be updated as devices enter and exit the service area or as devices join different multicast groups or subgroups. In other examples, the base URLs of the ranked list of UE devices (and/or other information) may be added to the manifest (MPD) file which is transmitted to the UEs.

AS shown in FIG. 3, UE 320A includes a media player 330, MBMS unit 340, SL/D2D interface 350, and a multicast/broadcast receiver 360.

In this example, the MBMS unit 340 is configured to receive the media stream from the transmitter 310 via the multicast/broadcast receiver 360. The MBMS unit includes a media handler unit (MHU) 342, which includes a proxy having a cache 344. In one example, the MHU replaces an HTTP proxy in the MBMS unit in UE. The MHU is communicatively coupled to the SL/D2D interface 350, enabling the MHU to discover and connect to one or more other UEs in proximity to UE 320A using proximity services. The MHU is also configured to detect a missing media segment or a partial segment from a segmented media stream received via the multicast/broadcast receiver 360, and to request the missing segment from another UE connected to the UE 320A by a D2D or SL connection via the interface 350.

The reverse proxy with cache (i.e., HTTP proxy) in the MHU 340 may act as an HTTP server to serve the received segments of the media content to the media player. The MBMS unit 340 receives the segments of the media content and delivers them to an application cache 344 at the MHU, from which the media player 330 can access them using HTTP requests. If a requested segment is not in the MHU cache 344, the MHU 342 may request the segment from another UE's MHU cache (e.g., the cache of UE 320B), which may then deliver the requested media segment to first UE's cache 344. The media player 330 can then receive the segment.

In some examples, the media player 330 may be configured to requests and retrieve media segments from the MBMS unit 340 (i.e., from the HTTP proxy 344 within MBMS unit 340), for presentation on a screen or display (not shown) of UE 320A. The media player may use the received MPD file or manifest file to determine the address of the next segment of the media content, and then request the next segment using that address. In some examples, the address may point to a location in the HTTP proxy 344, or, as described herein, may be in an HTTP proxy of another UE such as UE 320B.

The SL/D2D interface 350 is configured to enable communication between UEs, such as UEs 320A and 320B. It should be appreciated that the UE 320A may include other D2D communication technologies than 5G sidelink. In some examples, the interface 350 may enable communication using Proximity based Services (ProSe), which is a D2D technology specified in 3GPP that allows UEs to detect each other and to communicate directly with each other.

The multicast/broadcast receiver 360 may be an interface configured to enable reception of data from the transmitter 310.

Figure 4:
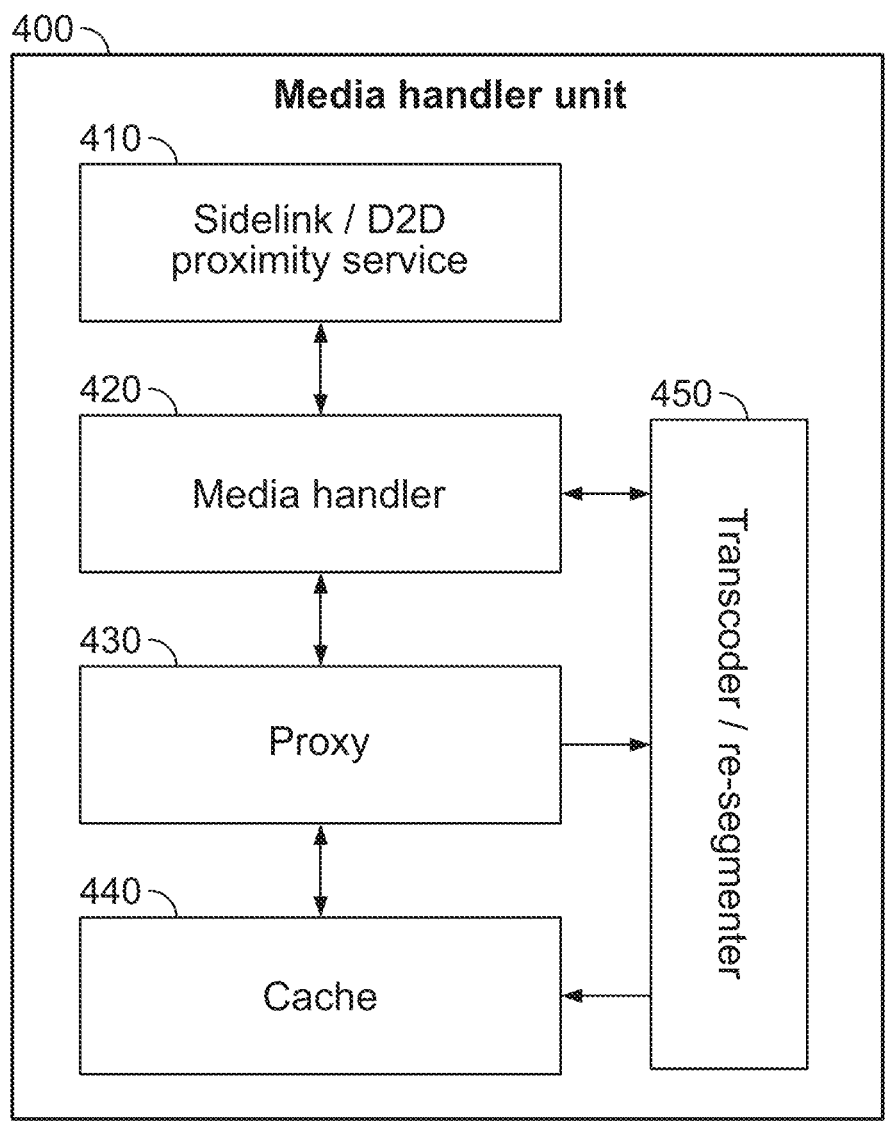
FIG. 4 shows a simplified block diagram of a Media Handler Unit of the devices of FIG. 3, in accordance with some embodiments of this disclosure.

FIG. 4 shows a simplified block diagram of an example Media Handler Unit 400, which may be similar or identical to the MHU 342 of UE 320A shown in FIG. 3. The MHU 400 may replace the HTTP proxy in the MBMS unit of some devices.

Alternatively, the MHU 400 may be positioned between the MBMS unit (i.e., the HTTP proxy) and the media player of some devices. In the illustrated example, the MHU 400 includes a sidelink.D2D proximity service 410, a media handler 420, a proxy 430, a cache 440, and a transcoder/re-segmenter 450.

In some examples, the MHU 400 may use the sidelink/D2D proximity service 410 to discover other UEs nearby. The MHU may also use the sidelink/D2D proximity service to interface with other UEs, such as those on the ranked list of UEs received for instance from the supplemental metadata in the USBD. In addition, the MHU may use the sidelink/D2D proximity service to send and retrieve information with other UEs, such as requests for segments and the segments themselves.

The media handler 420 may act as a controller for the other parts of the media handler unit 400. The proxy 430 and cache 440 operate as a storage for received media segments, and may be referred to herein as the "local proxy" or "HTTP proxy" in some examples. The local proxy 430 and cache 440 may store the received segments, and provide them to the media player of the UE upon request from the UE that includes the MHU 400, or provide them to or another UE upon reception of a request from the media player of that other UE.

The transcoder/re-segmenter 450 may be configured to change the media segment duration or size. For instance, segments may be transmitted to the UE having a first size, and the transcoder/re-segmenter 450 may change the size by breaking the segment into two or more segments, and performing any other necessary manipulation of the received segment.

Figure 5:
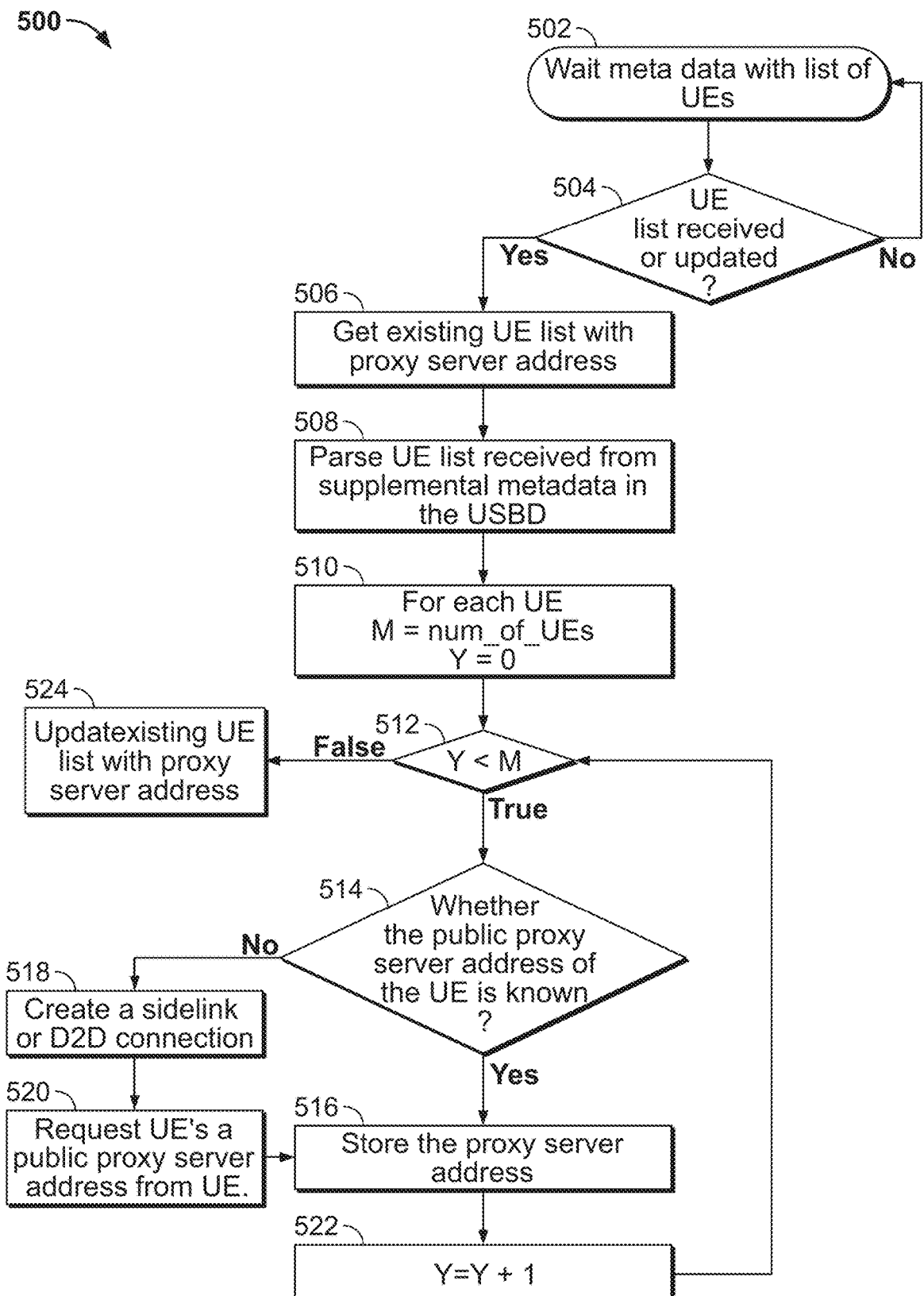
FIG. 5 shows a simplified flowchart of a method for identifying proximate user devices joined to the primary multicast with which to establish sidelink or D2D connections, in accordance with some embodiments of this disclosure.

FIG. 5 shows a simplified flowchart of an example method 500 for identifying proximate user devices joined to a primary multicast, to enable a UE to establish a sidelink or D2D connection in order to retrieve missing or dropped segments. The method 500 may occur after a UE has joined a primary multicast of media content from a second device (e.g., transmitter or base station), via a first network (e.g., a mobile network).

At steps 502-504, method 500 begins by the UE determining whether a UE list has been received or updated. In some examples, the UE list may include information about other UEs joined to the multicast, and/or a ranked list of the UEs. The UE list may be sent by the transmitter of the multicast, or may be sent by another UE joined to the multicast. In some examples, the UE list may be included in a service announcement or USBD sent by the transmitter. The UE list or UE information can include a ranked list or simply a list of devices, as well as device information like the location, sub-group within the devices joined to the multicast, each UE's capability of acting as a source or transmitter for a supplemental multicast or broadcast, and more. In some examples, the UE list or information may include an indication of a proximate third device (e.g., another UE) that is joined to the primary multicast of media content from the second device. The UE list or UE information may be sent at the beginning of the multicast session, and it may be updated and resent if one or more UE's statuses change or a UE joins or leaves the multicast session. In addition, the UE list or UE information can be updated and resent based on various triggers, such as a UE device battery level change beyond a threshold, location change beyond a threshold, signal strength change beyond a threshold, and more. In some examples, the UE list or UE information may be included in a service announcement transmitted to the UE via unicast by the transmitter, wherein the service announcement includes a list of devices joined to the primary multicast ranked based on (a) a location of the first device and (b) the respective locations of the devices in the list of devices joined to the primary unicast. That service announcement may be transmitted to the UE in response to the UE joining the multicast.

If the UE has not yet received the UE list, method 500 proceeds back to step 502 to wait for the initial or updated UE list from the transmitter (or from another UE). Alternatively, if a UE list has been received or updated, method 500 proceeds to step 506.

At step 506, the UE retrieves the existing UE list. The existing UE list may contain the proxy server address of one or more of the UEs on the list (i.e., the address at which each UE stores the received segments of the media stream, which is also the address from which a given UE may request a dropped or missing segment). The UE list may be a part of the USBD received by the MBMS unit of the UE (e.g., via the multicast/broadcast receiver 360 of UE 320A in FIG. 3).

At step 508, the UE parses the UE list from the USBD. The USBD may be part of a service announcement transmitted by the transmitter. Parsing the USBD (or service announcement) can include analyzing the received service USBD or service announcement to identify one or more UEs that are joined to the primary multicast.

Steps 510-524 comprise a loop of steps, wherein the loop is performed for each UE on the UE list that was parsed at step 508. During the loop of steps 510-524, a local proxy address for each UE on the UE list is determined and stored. This enables the UE to store a list of UEs and their respective proxy addresses from which a dropped or missing segment may be requested and retrieved.

At step 512, the UE determines whether all UEs on the UE list have been analyzed (i.e., whether a proxy address has been determined and stored). If there are more UEs on the UE list that must be analyzed, method 500 proceeds to step 514.

At step 514, the UE determines whether the public proxy address of the currently-being-analyzed UE is known. If the address is known (i.e., if the address was provided by the transmitter in the USBD via the service announcement, in the manifest, or is otherwise known), then the UE stored the address at step 516.

If the address of the currently-being-analyzed UE is not known, at step 518 the UE creates an SL or D2D connection with that UE. At step 520, the UE requests the public proxy address of the currently-being-analyzed UE. The UE then stores this public proxy address at step 516.

In some cases, the public proxy address for a target UE may not be known, and an SL or D2D connection may not be available. In this case, the process may skip that target UE and proceed to the next UE on the list.

At step 522, the UE proceeds by incrementing a counter, and proceeding back to step 512 to begin the analysis of the next UE on the UE list. Once all UEs on the UE list have been analyzed and their respective public proxy addresses have been stored (or the UE skipped where an address cannot be determined), the method proceeds to step 524.

At step 524, the UE updates the UE list with the recently determined proxy server addresses. The MHU of the UE may provide an MPD file or other manifest file with the MHU local proxy server address (e.g., 127.0.0.1 for IPV4) to the media player of the UE. The media player can then send requests to the local proxy address according to the media segments availability times in the manifest.

Figure 6:
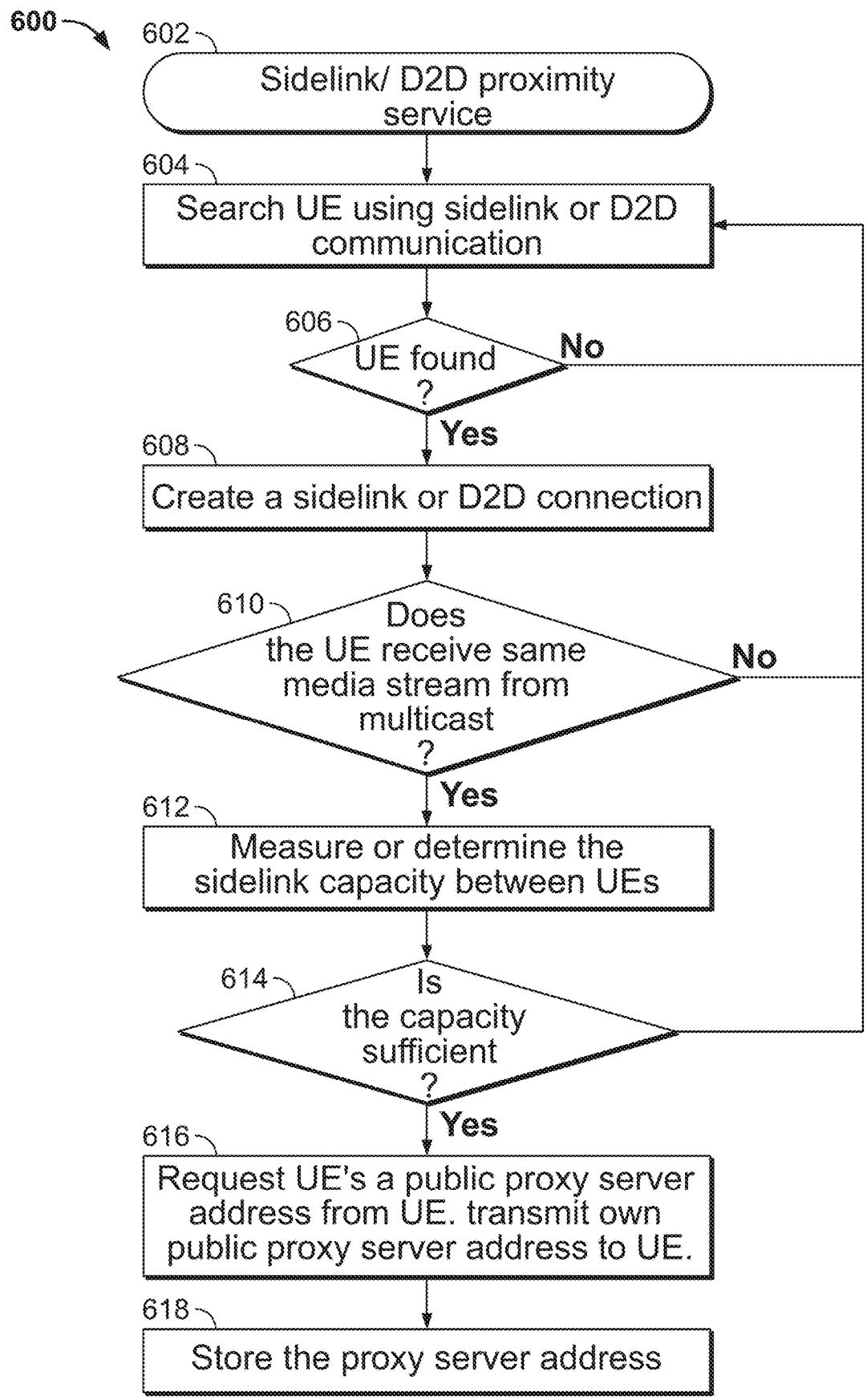
FIG. 6 shows a simplified flowchart of a method for establishing a sidelink or D2D connection with a proximate device, in accordance with some embodiments of this disclosure.

FIG. 6 illustrates a second technique for determining and storing the local proxy addresses of proximate UEs. FIG. 6 shows a simplified flowchart of a method 600 for establishing an SL or D2D connection between a first UE and a proximate device (e.g., a second UE). In some examples, the transmitter may send a UE list or UE information to the first UE (as discussed above with respect to FIG. 5). In other examples, the first UE may determine local or proximate UEs via another technique, which may replace or supplement the UE list or UE information received from the transmitter. Method 600 may include the first UE determining, on its own, the one or more UEs which are joined to the multicast and are receiving the same stream from the transmitter, and which are available for a direct connection via an SL or D2D connection.

At step 602, the method 600 for a first UE to determine one or more proximate UEs and store their respective proxy addresses begins.

At step 604, the first UE searches for other proximate or local UEs using ProSe (e.g., SL or D2D communication). The first UE can use another communication technique as well, including for example any technique that does not include the use of the transmitter or base station.

At step 606, the first UE determines whether a second UE has been found in step 604. If no second UE has been found, the process 600 proceeds back to step 604 to continue searching for a second UE.

If the first UE finds a second UE at step 606, step 608 includes the first UE creating an SL or D2D connection (or connection via another suitable technique or protocol).

At step 610, the first UE determines whether the identified second UE receives the same media stream from the primary multicast. This can include transmitting and receiving one or more messages between the first UE and the second UE. Step 610 may include determining whether the first UE and the second UE are receiving the same primary multicast, which may indicate whether the second UE could be a potential source from which the first UE may request missing segments of the primary multicast. If the second UE is not receiving the same media stream from the multicast as the first UE, or is not joined to the multicast, method 600 may proceed back to step 604 to search for another UE.

In some examples, step 610 may also include the first UE determining whether the second UE has enabled SL or D2D communication for the purpose of sharing missing segments. In some examples, a user preference of the second UE may indicate that the second UE may or may not be allowed to be used as a source for a secondary or supplemental multicast of missing segments. In some cases, the default option may be to allow SL or D2D connections for this purpose, and a user may select to prevent their device from being used for the purposes noted herein.

At step 612, if the second UE is joined to the multicast and is receiving the same media stream from the multicast as the first UE, method 500 includes the first UE measuring or determining the SL or D2D communication capacity or performance characteristics. This could include measuring or determining the SL or D2D signal strength, bandwidth, second UE battery life remaining (i.e., whether the second device is about to turn off and would not be available for retrieval of segments in the future), and more. In other words, step 612 may include the first UE determining whether the second UE is an appropriate device from which to retrieve missing segments from the primary multicast, should the need arise.

At step 614, the first UE determines whether the measured or determined capacity and other performance metrics from step 612 are sufficient for the purposes of retrieving missing segments from the primary multicast. If the second UE is lacking in any way (e.g., has a weak signal, low bandwidth, poor performance, etc.), method 600 may proceed back to step 604 to search for another UE.

But if the SL or D2D connection between the first UE and the second UE has sufficient capacity (and/or the performance metrics are above a performance threshold), method 600 proceeds to step 616.

At step 616, the first UE and the second UE exchange public proxy server addresses, and at step 618 each UE stores the other UE's public proxy server address. This step enables the first UE to request missing segments from the second UE via the SL or D2D connection using the second UE's public proxy address.

Method 600 may then end once a suitable second UE has been determined and the public proxy server address of that second UE is saved by the first UE. Alternatively, method 600 may repeat from step 604, and a third UE (or any number of additional UEs) may be discovered and their respective public proxy server addresses stored.

Figure 7:
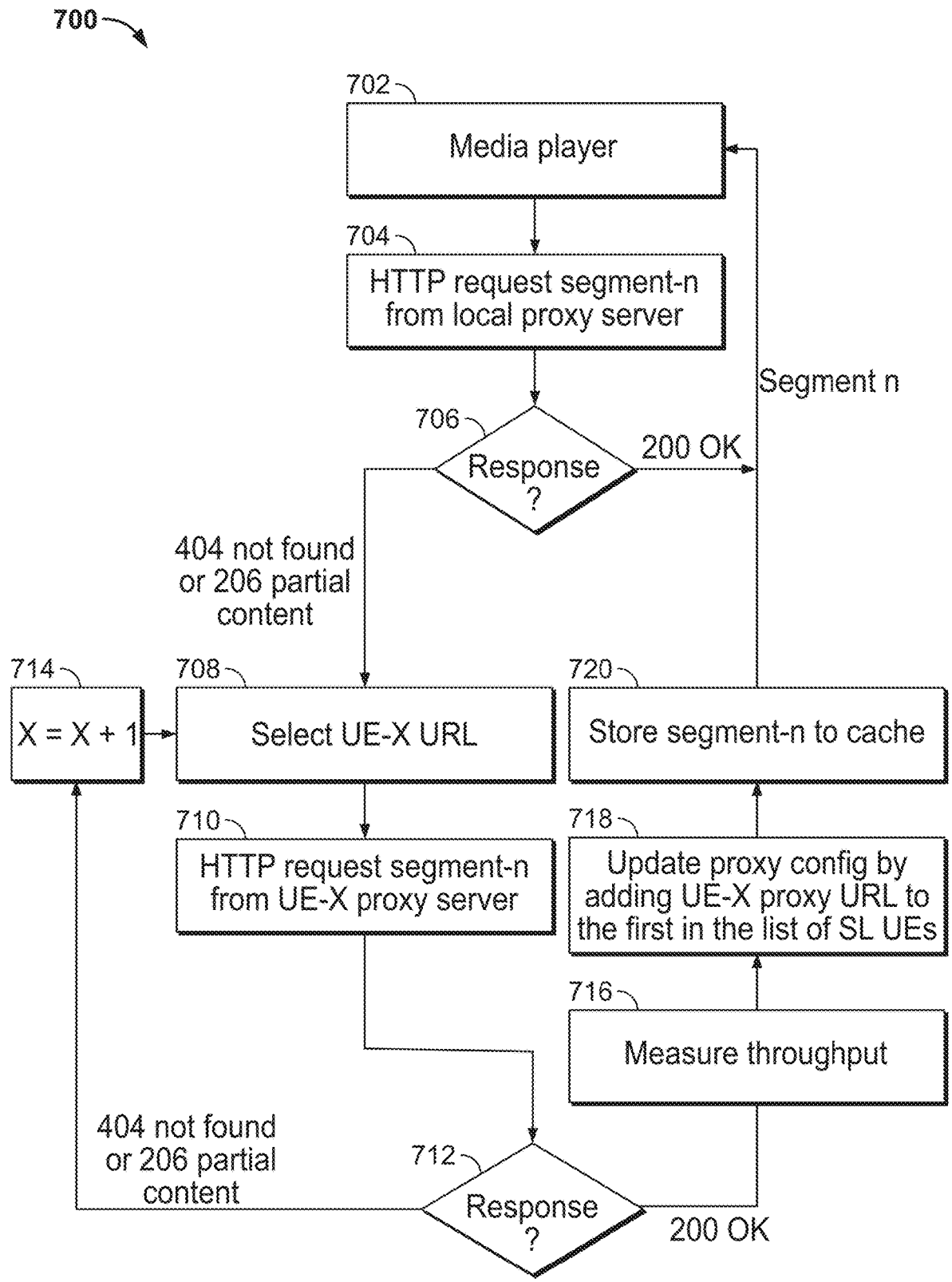
FIG. 7 shows a simplified flowchart of a method for retrieving missing media segments, in accordance with some embodiments of this disclosure.

FIG. 7 shows a simplified flowchart of a method 700 for a first UE retrieving missing media segments from a second UE. The media player of the first UE attempts to display media content by requesting the segments of the media content from the local proxy of the first UE. However, if a segment is corrupted, dropped, missing, or otherwise not in a condition to be presented, the media player may request the segment from another source (e.g., a second UE via a supplemental multicast). FIG. 7 illustrates an example method for a first UE to determine that a segment is missing and for retrieving the missing segment from a second UE.

In some examples, the first UE may join a supplemental multicast of the media content from a second UE. The supplemental multicast may include less than all segments of the primary multicast. For instance, the supplemental multicast transmitted by the second UE may include transmitting segments of the media content of the primary multicast only when those segments are specifically requested by one or more UEs. The primary multicast may comprise a transmitter having a first coverage area or range, and the supplemental multicast may comprise a second coverage area that is less than the first coverage area, and which is encompassed within the first coverage area.

At step 702, method 700 begins. The media player of the first UE begins presenting segments of the media content received from the primary multicast via a display of the first UE.

At step 704, the media player makes an HTTP request for a next segment. The HTTP request is sent to the local proxy server of the first UE, which is where the segments of the media content are stored after being received from the transmitter via the primary multicast.

At step 706, the media player receives a response to the HTP request. If the response is a 200 OK response (i.e., the requested segment is stored in the local cache and is ready to be displayed), the requested segment is then displayed by the media player on the display of the first UE, and method 700 proceeds back to step 702 to request and fetch the next segment.

However, if the response to the HTTP request at step 706 is either that the requested segment is missing, corrupted, partially present, or is otherwise not available (e.g., a response of 404 not found or 206 partial content), method 700 proceeds to step 708. At step 708, the media player selects an alternate source from which to retrieve the missing segment. In the illustrated example, the alternate source is a second UE located in proximity to the first UE. The second UE may be one of the UEs determined using processes 500 or 600, for example.

At step 710, the media player sends an HTTP request for the missing segment to the second UE.

At step 712, the media player receives a response from the second UE. If the response from the second UE indicates that the requested segment is also missing, corrupted, partially present, or is otherwise not available in the local cache of the second UE, the response is a 404 not found or 206 partial content response. This indicates that the MBMS unit in the second UE has not received the segment correctly.

In this case, the process proceeds to step 714.

At step 714, the media player in the first UE increments a counter and selects a next nearby or proximate UE from which the missing segment might be retrieved. Steps 708-714 are repeated while proceeding down the list of proximate UEs until the first UE receives a 200 OK response indicating that the missing segment is stored by the target UE.

Once a suitable target UE having the missing segment is found (i.e., as indicated by a response of 200 OK), at step 716 the media player measures the throughput from the target UE to the first UE.

At step 718, the first UE updates its local proxy configuration (i.e., the instructions for where to access segments that are dropped from the primary multicast) by adding the target UE public proxy address to be the top or first-checked UE in the event another segment is dropped. This enables the media player to prioritize the target UE in the event another media segment is dropped, and jump right to requesting the next missing segment from the target UE since it is known that the target UE has a possibly better connection to the primary multicast.

At step 720, the first UE receives the missing segment from the target UE via an SL or D2D connection, and stores the missing segment in its own cache. The media player then requests the previously dropped segment from the local cache and displays the segment. The local cache also stores the previously dropped segment to enable it to act as the target UE for another UE. That is, if a third UE joined to the primary multicast dropped that same segment, when that third UE requests the segment from the first UE, the first UE can then provide that segment to the third UE rather than retuning a 404 NOT FOUND message. If many UEs dropped the same segment form the primary multicast, this process of requesting and storing local copies of the segments enables all the UEs to retrieve the missing segments quickly, since each UE that receives the missing segment from a target UE then is able to act as a target UE itself for other UEs.

The method 700 continues back to step 702 after retrieving each next segment, until all the segments of the media content are retrieved, or until the user turns off or stops the stream.

Figure 8:
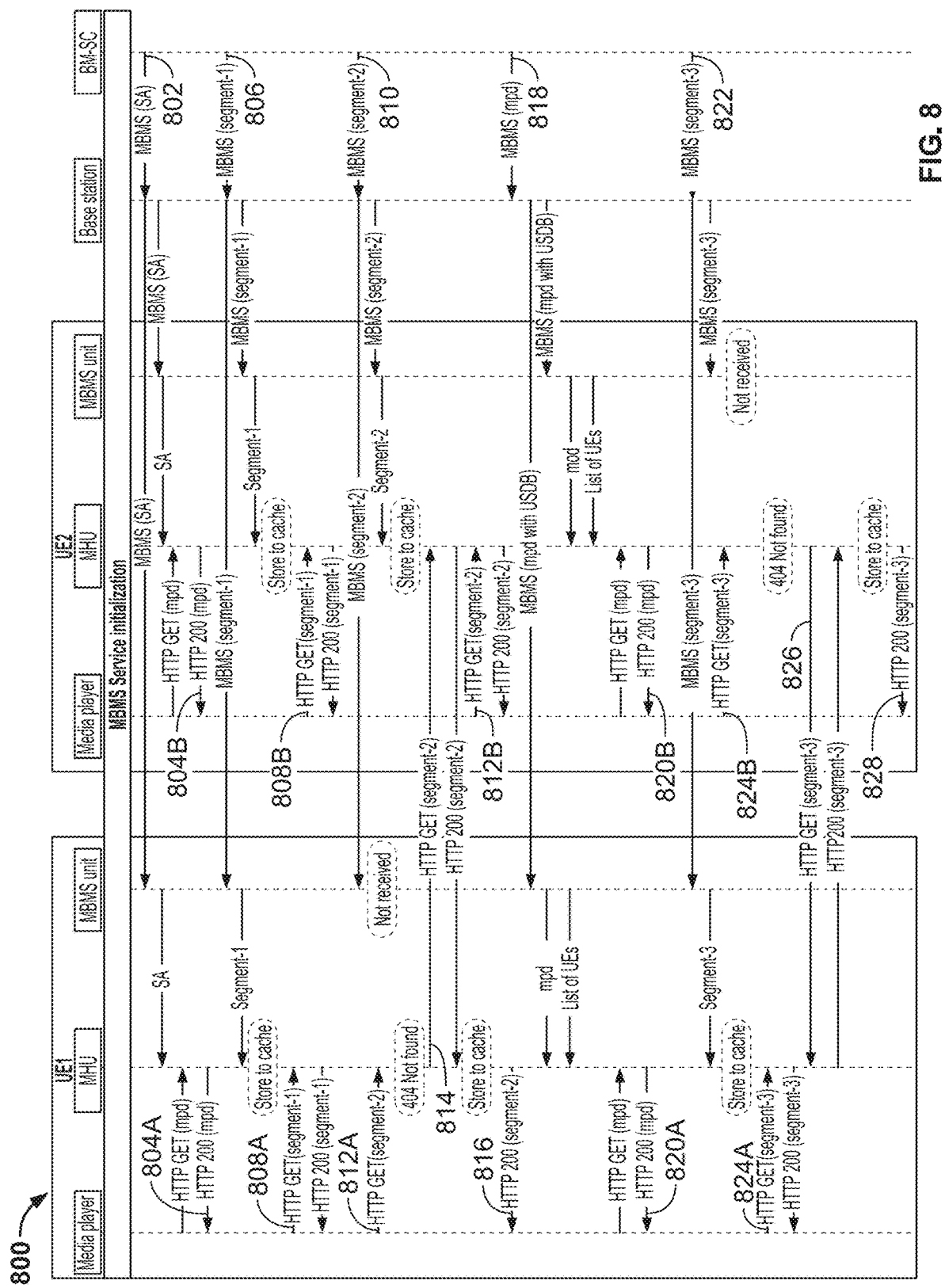
FIG. 8 shows a simplified sequence diagram illustrating steps of requesting and receiving missing media segments, in accordance with some embodiments of this disclosure.

FIG. 8 shows a simplified sequence diagram 800 illustrating steps of receiving media content via a primary multicast, dropping a segment, and requesting and receiving the missing segment via a supplemental multicast from another UE joined to the primary multicast. In this example, there may be certain prerequisites, including (1) UE1 and UE2 are instrumented with the Media Handling Unit application, (2) UE1 and UE2 can connect to each other using SL or D2D communication, (3) the media streaming system delivers DASH media content from the content server to Broadcast-Multicast-Service Centre (BM-SC) via eMBMS, and (4) MBMS service has been initialized. The service announcement of the available content is in the air, and the content is selected in the UE.

At step 802, the process 800 begins by the BM-SC sending a service announcement via the MBMS. The service announcement includes the MPD file (e.g., manifest) and the USBD (which may be modified to include UE information and/or a ranked list of UEs joined to the multicast). The BM-SC transmits the service announcement to the base station, which then transmits the service announcement to each UE. At each UE, the service announcement is received at the respective MBMS unit, and is then passed from the MBMS unit to the MHU. The MHU parses the service announcement and updates the list of UE devices (which may be accessed to request a dropped segment as discussed with respect to FIGS. 5-7).

At steps 804A-B, the respective media players in UE1 and UE2 respectively request the MPD file from their local proxy in their respective MHUs. The MPD file enables the media player to request the segments of the media content to present to the user of the UE.

At step 806, the BM-SC and base station transmit the first segment (segment-1) of the media content to all UEs that have joined the primary multicast. In this case, both UE1 and UE2 have joined the primary multicast using eMBMS. The MBMS unit (i.e., MBMS Client) in UE1 and UE2 receives the eMBMS signal and stores segment-1 to the local cache in the MHU for a predefined storage time period. During the predefined storage time period, other UEs who have dropped this segment may request the segment from the UE (since the segment remains stored for the predefined storage time period). In some examples, where there is bad connectivity, weak signal strength, poor network performance, a large number of dropped segments by a number of UEs, and/or a lot of requests for retrieval of dropped segments between the UEs, the predefined storage time period may be increased to account for the increased dropping of segments. Alternatively, where there is good connectivity, strong signal strength, good network performance, a low number of dropped segments, and/or a low number of requests for retrieval of dropped segments between the UEs, the predefined storage time period may be decreased to reduce resource usage at each UE.

At step 808A, the media player in UE1 sends an HTTP GET segment-1 request to the MHU local proxy in UE1, which redirects the HTTP GET request to the MHU cache in UE1 as depicted in FIG. 7. The MHU sends segment-1 via the local proxy to the media player for presentation to the user of UE1.

Similarly, at step 808B, the media player in UE2 sends an HTTP GET segment-1 request to the MHU local proxy in UE2, which redirects the HTTP GET request to the MHU cache in UE2 as depicted in FIG. 7. The MHU sends segment-1 via local proxy to the media player for presentation to the user of UE2.

At step 810, the BM-SC and base station transmit segment-2 to all UEs that have joined the multicast. In this example, however, UE1 does not receive the segment correctly. As a result, the MBMS unit of UE1 cannot pass segment-2 on to the local cache in the MHU of UE1. UE2's MBMS unit, however, does correctly receive segment-2 and passes segment-2 on for storage in the cache of the MHU of UE2.

At step 812A, the media player of UE1 sends an HTTP GET segment-2 request to the MHU local proxy in UE1, which redirects the HTTP GET request to the MHU cache in UE1 as depicted in the FIG. 7. In response, the MHU cache sends a 404 NOT FOUND response, because segment-2 was not properly received and stored in the cache. Other responses may be a 206 PARTIAL response, or a 200 OK response. In some examples, UE1 may detect a missing segment in the application layer based on the HTTP response code (e.g., based on a 404 NOT FOUND response), rather than based on missing data packets.

At step 814, the MHU local proxy in UE1 redirects the HTTP GET request from the media player to the MHU local proxy server of UE2. If segment-2 is stored in the local proxy server cache of UE2, UE2 sends segment-2 back to UE1 via the SL or D2D connection between UE1 and UE2. The MHU in UE1 then stores segment-2 in the cache of UE1 for the predefined storage time period. If segment-2 is not stored in the local proxy server cache of UE2, UE2 returns a 404 NOT FOUND response to UE1. The MHU local proxy in UE1 may then redirect the HTTP GET segment-2 request to UE3 (not shown) if UE3 is connected to UE1 via an SL or D2D connection. UE1 may continue searching for another UE that has segment-2 stored until one is found.

At step 816, media player 1 retrieves the stored segment-2 from the cache of UE1, for display to the user of UE1.

At step 812B, the media player in UE2 sends an HTTP GET segment-2 request to the MHU local proxy in UE2, which redirects the HTTP GET segment-2 request to the MHU cache in UE2 as depicted in FIG. 7. The MHU sends segment-2 via local proxy to the media player of UE2 for display to the user.

When a minimumUpdatePeriod of the MPD is enabled, the UEs receive MPD updates sent in the FLUTE session with the media segments. At step 818, the BM-SC and base station send out an updated MPD file. In some examples, the MPD file may also include updated UE information and/or an updated ranked list of UEs. The BM-SC sends the MPD update as a FLUTE object. The base station may add a metadata envelope with an updated list of UEs and/or UE information that can be used by one or more UEs to retrieve missing segments.

At steps 820A-B, the MHUs of UE1 and UE2 parse the UE list from the updated MPD file as described with respect to FIG. 5. The media players in UE1 and UE2 each request the updated MPD file from their local proxies in the respective MHUs.

At step 822, the MBMS service transmits segment-3 to all UEs that have joined the primary multicast using eMBMS. In this example, however, UE2 does not receive segment-3 correctly. As a result, the MBMS unit of UE2 cannot pass segment-3 on to the local cache in the MHU of UE2. UE1's MBMS unit, however, does correctly receive segment-3 and passes segment-3 on for storage in the cache of the MHU of UE1.

At step 824A, the media player in UE1 sends an HTTP GET segment-3 request to the MHU local proxy in UE1, which redirects the HTTP GET segment-3 request to the MHU cache in UE1 as described with respect to FIG. 7. The MHU of UE1 sends segment-3 via local proxy to the media player of UE1 for display.

At step 824B, the media player in UE2 sends an HTTP GET segment-3 request to the MHU local proxy in UE2, which redirects the HTTP GET segment-3 request to the MHU cache in UE2. The MHU cache sends a 404 NOT FOUND response.

At step 826, the MHU local proxy in UE2 redirects the HTTP GET segment-3 request to the MHU local proxy server of UE1. UE1 sends segment-3 to UE2 via the UE2 MHU local proxy server, and the local proxy server of UE2 stores segment-3 for the predefined storage time period.

At step 828, the media player of UE 2 retrieves the stored segment-3 from the cache of UE2 for display.

Figure 9:
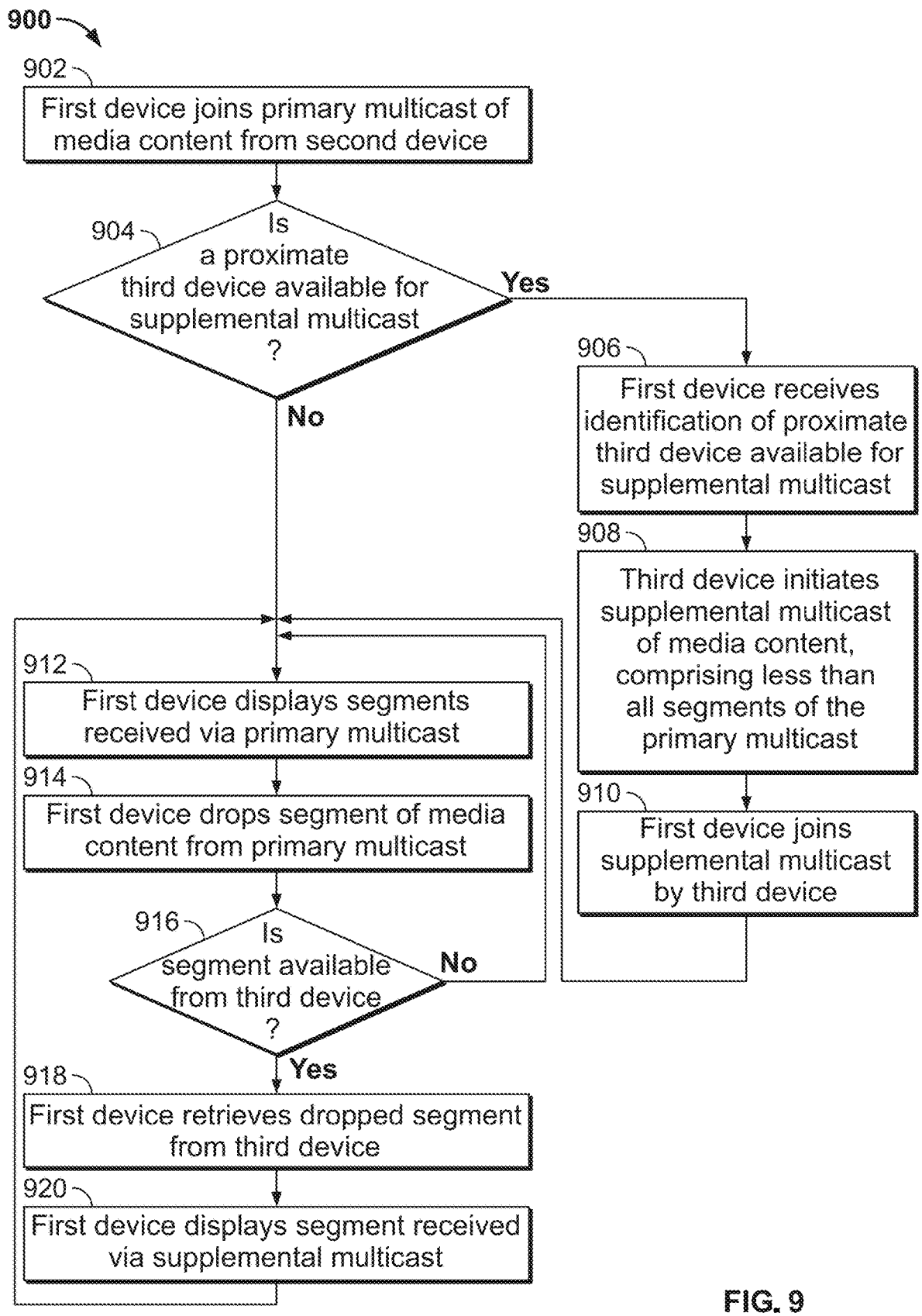
FIG. 9 is a flowchart of an illustrative process for establishing a primary multicast for segments of media content, and establishing a supplemental multicast to retrieve missing segments of media content that were unable to be received via the primary multicast, in accordance with some embodiments of this disclosure.

FIG. 9 is a flowchart of an illustrative process 900 for establishing a primary multicast for segments of media content and establishing a supplemental multicast to retrieve missing segments of media content that were unable to be received via the primary multicast. In various embodiments, the individual steps of process 900 may be implemented by one or more components of the devices and systems described with respect to FIGS. 1-8 and 10. Although the present disclosure may describe certain steps of the process (and of other processes described herein) as being implemented by certain components of the devices and systems of FIGS. 1-8 and 10, this is for purposes of illustration only, and it should be understood that other components of the devices and systems of FIGS. 1-8 and 10 may implement those steps instead. Additionally, certain steps of the process 900 are described as occurring in a particular order. However, it should be understood that the steps of process 900 may be carried out in a different order, one or more steps may be removed, and/or one or more steps may be added.

At step 902, a first device joins a primary multicast of media content from a second device. This may include control circuitry of the first device operating along with input/output circuitry of the first device to join the primary multicast. As noted above, the second device may be a base station or other transmitter of the primary multicast.

At step 904, the control circuitry of the first device determines whether there is a proximate third device available for a supplemental multicast. In some examples, the first device receives a list of proximate third devices from the base station or transmitter. In other examples, the first device, on its own without the base station or transmitter, discovers and determines that there are one or more proximate third devices. The one or more third devices may include other devices that are joined to the primary multicast, and which are capable of connecting to the first device via a SL or D2D connection. In some embodiments, if a third device is capable of multicasting only part of the primary multicast, the second device may provide this information to the first device for example in the USBD or in metadata. If more than one third device is needed to retrieve any corrupted or missing data (e.g., corrupted packets or segments), the first device may determine this from the second device so it may subscribe to multiple supplemental multicasts.

In one example, if there are one or more proximate third devices joined to the primary multicast, step 906 includes the first device receiving an identification of the proximate third devices (e.g., such as in a service announcement or USBD from the base station or transmitter).

At step 908, the third device initiates a supplemental multicast of the media content, comprising all or less than all segments of the primary multicast. This can include the third device making available the segments of the media content received via the primary multicast. It may also include the third device (and/or the first device) establishing communication, and sharing their respective local proxy addresses so that other devices can request missing segments.

At step 910, the control circuitry in connection with the input/output circuitry of the first device causes the first device to join the supplemental multicast by the third device. This can include the first device storing the local proxy address of the third device, or otherwise taking one or more actions to enable the first device to receive segments of the media content from the third device via the supplemental multicast.

At step 912, the input/output circuitry of the first device receives one or more segments of the media content via the primary multicast, and the control circuitry of the first device displays the one or more segments received via the primary multicast.

At step 914 the control circuitry and/or the input/output circuitry of the first device determines that a segment of the media content has been dropped or failed to be received via the primary multicast.

At step 916, the control circuitry of the first device determines whether the dropped segment is available from the third device via the supplemental multicast. This can include the first device transmitting a request to the local proxy of the third device. Or, alternatively, the first device may receive the dropped segment from the third device without making a request to the third device. If there is no third device available (i.e., there is no supplemental multicast), the first device may continue to display segments received from the primary multicast. If a segment is dropped, the segment may not be displayed to the user.

At step 918, if the dropped segment is available at the third device, the control circuitry and/or the input/output circuitry of the first device may retrieve the dropped segment via the supplemental multicast form the third device. Any other devices who drop one or more segments may also retrieve their respective dropped segments from the third device via the supplemental multicast as well.

At step 920, the first device displays the (previously dropped) segment that was received via the supplemental multicast from the third device. The process 900 then continues back to step 912, where additional segments are received via the primary multicast and displayed to the user of the first device. The process 900 may end when a user selects the end option or exits the media stream.

In some examples, multiple UEs or devices that are joined to the primary multicast may fail to receive one or more segments. In the case where (a) a first device has failed to receive a first segment of the media content via the primary multicast from the second device, (b) a third device has received the first segment, and has established a supplemental multicast, and (c) a fourth device has also failed to receive the first segment of the media content via the primary multicast from the second device, the third device may simultaneously provide the first segment to both the first device and the fourth device via the supplemental multicast. Similarly, if the first device has failed to receive the first segment, and the fourth device has failed to receive a second segment, the third device may simultaneously provide the first segment to the first device and the second segment to the fourth device via the supplemental multicast.

In some examples, the system may include two or more different UEs or devices supporting the supplemental multicast, wherein each of the two or more different UEs provides a different portion of the missing segment. For instance, one UE might serve the I or IDR frame(s) of the missing segment, while another can serve the P- and B-frame(s)) based on proximity to the requesting UE and the respective SL or D2D capacities between the UEs. In one example, the media content comprises one or more segments, each segment comprising one or more I-frames and one or more P- or B-frames. An example method may include, in response to determining that the first device has failed to receive a first segment of the media content via the primary multicast: (a) retrieving the one or more I-frames of the first segment from a third device via the supplemental multicast, and (b) retrieving the one or more P- or B-frames of the first segment from a fourth device, wherein the third and fourth devices are joined to the primary multicast of media content from a second device.

In some examples, after a first UE joins the primary multicast session, it may request the first segment(s) via SL or D2D connection from a second UE which has already joined the primary multicast session and received the previous segments already. This may reduce initial playback delay for the first UE. Thus, when the first UE joins the primary multicast, it may retrieve the first segments over an SL or D2D connection from the second UE's cache, and then later retrieve the next segments via the primary multicast. In this example, the first UE may use the length of a time shift buffer (e.g., timeShiftBufferDepth) from the manifest file to deduce how many seconds of previously received segments are available in the cache, and are thus available to receive from the second UE. In an example, a method may include (a) joining, by a fourth device, the primary multicast, (b) receiving, by the fourth device from the second device via the supplemental multicast, a first set of segments of the media content, wherein the fourth device receives the first set of media segments of the media content before receiving any segment of the media content from the second device via the primary multicast, and (c) after receiving the first set of segments of the media content from the third device via the supplemental multicast, receiving a second set of segments of the media content from the second device via the primary multicast.

In some examples, a UE may first automatically join the supplemental multicast from the third device, and then switch (e.g., based on network conditions) to the primary multicast session at a later time.

In some examples, after the first UE has joined the primary multicast session, the first UE may lose the connection. During a connection outage, the first UE may request segments of the media content via an SL or D2D connection from a second UE which is still able to receive the segments via the primary multicast. In this example, the second UE may be unable to request missing segments from the first UE.

In some examples, the system may change the size of the segments of the media content based on one or more factors. For example, if the number of UEs requesting missing segments increases, the system can adjust the video segment size for a group, sub-group, or all users in a service area. This may be done by transcoding or re-segmenting the input video at the UE (MHU), base station or BM-SC. This may require the creation of two different manifests that reference different video segment sizes. Or in other words, it may require an update to the manifest file being sent to the UEs to include new segment length or byte range associated with a request. In an example method, in response to determining that more than a threshold number of devices joined to the primary multicast have failed to receive one or more segments of the media content from the second device via the primary multicast, the method may include modifying a segment size of the segments of the media content transmitted via the primary multicast.

Figure 10:
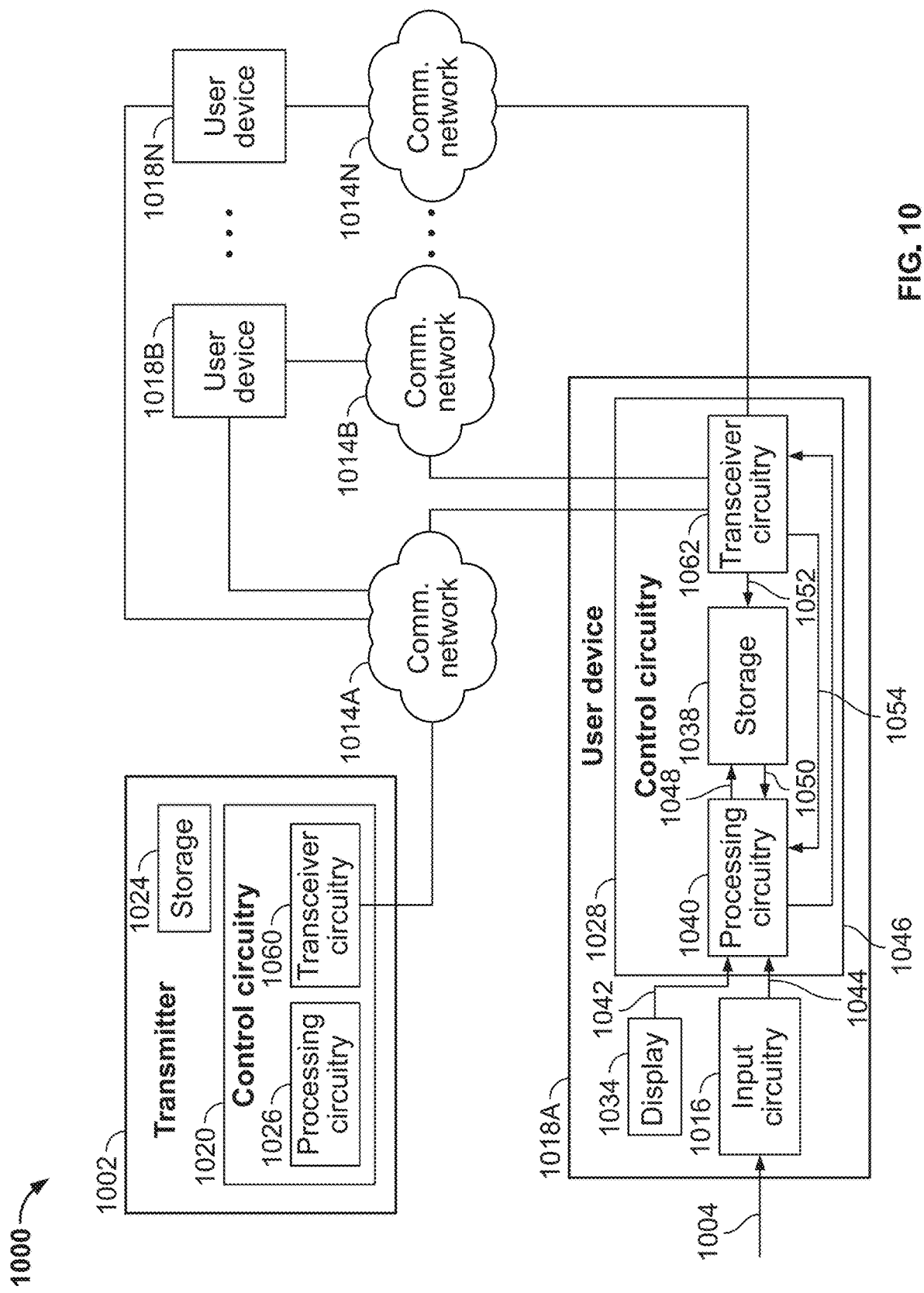
FIG. 10 is a block diagram representing devices, components of each device, and data flow therebetween for an example system, in accordance with some embodiments of this disclosure.

FIG. 10 is a block diagram representing devices, components of the devices, and data flow therebetween for an example system, in accordance with some embodiments of this disclosure.

System 1000 is shown to include a first device (UE) 1018A, a plurality of additional devices (UEs) 1018B-N, a transmitter 1002 (which may include transceiver circuitry 1060), and communication networks 1014A-N. It should be appreciated that while a single instance of a component may be shown and described relative to FIG. 10, additional instances of the component may be employed. For example, transmitter 1002 may include or may be incorporated in, one or more servers. Additionally, there may be additional UEs, each communicatively coupled to the transmitter 1002, and/or to each other. Similarly, communication networks 1014A-N may include or may be incorporated in, more than one communication network. Transmitter 1002 is shown communicatively coupled to user devices 1018A-N through communication networks 1014A. While not shown in FIG. 10, transmitter 1002 may be directly communicatively coupled to one or more of user devices 1018A-N, for example, in a system absent or bypassing communication network 1014A.

In some examples, a request to stream a content item is made by a user device or a network device. For example, a user device or a network device (e.g., a laptop, PC, smartphone, smart TV, or the like) requests to view a content item from one or more CDNs, which may include one or more servers.

In some examples, the content item comprises segments that comprise an adaptive bitrate stream compatible with the MPEG-DASH standard, or other implementations such as Apple HLS. In some embodiments, the first stream of content is encoded at a first maximum bitrate and/or a first resolution. For example, the request may be a request for the next segment of an adaptive bitrate stream, and therefore the first stream of multimedia content is at a first maximum bitrate (or resolution) based on the first network bandwidth. In some examples, the second stream of multimedia content is encoded at a second maximum bitrate and/or a second resolution. For example, the request may be a request for the second segment of an adaptive bitrate stream, and therefore the second stream of multimedia content is at a second maximum bitrate (or resolution) based on new current network bandwidth, different from the first network bandwidth. The second stream may be a higher bitrate than the first stream, or vice versa, depending on the network bandwidth at the current time of the request. Accordingly, in some embodiments, each of the alternative streams comprises a plurality of bitrate variants.

In some examples, the segments of the content item are encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication networks 1014A-N may comprise one or more network systems, such as, without limitation, an internet, LAN, WIFI, or other network systems. In some embodiments, system 1000 excludes transmitter 1002, and functionality that would otherwise be implemented by one or more of transmitter 1002 is instead implemented by other components of system 1000, such as one or more components of communication networks 1014A-N. In still other embodiments, transmitter 1002 works in conjunction with one or more components of communication networks 1014A-N to implement certain functionality described herein in a distributed or cooperative manner. Similarly, in some embodiments, system 1000 excludes user device 1018A-N, and functionality that would otherwise be implemented by the user devices 1018A-N is instead implemented by other components of system 1000, such as one or more components of communication networks 1014A-N or transmitter 1002 or a combination. In still other embodiments, the user devices 1018A-N work in conjunction with one or more components of communication networks 1014A-N or transmitter 1002 to implement certain functionality described herein in a distributed or cooperative manner.

The user devices 1018A-N may be similar or identical. For simplicity, only user device 1018A is described in detail. The user device 1018A includes control circuitry 1028, display 1034, and input-output circuitry 1016. Control circuitry 1028 in turn includes transceiver circuitry 1062 (which may include two or more transceivers), storage 1038, and processing circuitry 1040. In some examples, the transceivers of transceiver circuitry 1062 may correspond to network interfaces for each of the networks 1014A-N. As such, each transceiver may provide access to a single communication network, or one or more transceivers may provide access to multiple communication networks.

Transmitter 1002 may comprise one or more components of a base station, described with respect to FIGS. 1-9 (e.g., transmitter 110, 210, or 310). Transmitter 1002 includes control circuitry 1020 and storage 1024. Each of the storages 1024 and 1038 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1024, 1038 may be used to store various types of content, media data, and or other types of data (e.g., they can be used to store multimedia content such as audio, video, and advertisement data). The non-volatile memory may also be used (e.g., to launch a boot-up routine and other instructions). Cloud-based storage may be used to supplement storages 1024, 1038 or instead of storages 1024, 1038. In some embodiments, the pre-encoded or encoded multimedia content, in accordance with the present disclosure, may be stored on one or more of storages 1024, 1038.

In some embodiments, control circuitry 1020 and/or 1028 executes instructions for an application stored on the memory (e.g., storage 1024 and/or storage 1038). Specifically, control circuitry 1020 and/or 1028 may be instructed by the application to perform the functions discussed herein. In some implementations, any action performed by control circuitry 1020 and/or 1028 may be based on instructions received from the application. For example, the application may be implemented as software or a set of executable instructions that may be stored on storage 1024 and/or 1038 and executed by control circuitry 1020 and/or 1028. In some embodiments, the application may be a client/server application where only a client application resides on user device 1018A, and a server application resides on transmitter 1002.

The application may be implemented using any suitable architecture. For example, it may be a stand-alone application wholly implemented on user device 1018A. In such an approach, instructions for the application are stored locally (e.g., in storage 1038), and data for use by the application is downloaded periodically (e.g., from an out-of-band feed, from an internet resource, or using another suitable approach). Control circuitry 1028 may retrieve instructions for the application from storage 1038 and process the instructions to perform the functionality described herein. Based on the processed instructions, control circuitry 1028 may determine a type of action to perform in response to input received from the input/output path (or input-output circuitry) 1016 or the communication network 1014A.

In some embodiments, communication network 1014A may enable the primary multicast from the transmitter 1002 to a plurality of user devices, such as devices 1018A-N. Communication networks 1014B-N may enable SL or D2D communication between user devices, such as between user devices 1018A and 1018B.

In client/server-based embodiments, control circuitry 1028 may include communication circuitry suitable for communicating with an application server or CDN (e.g., a server coupled to part of transmitter 1002) or other networks or servers. The instructions for carrying out the functionality described herein may be stored on an application server or CDN. Communication circuitry may include a cable modem, an Ethernet card, or a wireless modem for communication with other equipment, or any other suitable communication circuitry. Such communication may involve the internet or any other suitable communication networks or paths (e.g., communication networks 1014A-N). In another example of a client/server-based application, control circuitry 1028 runs a web browser that interprets web pages provided by a remote server. For example, the remote server may store the instructions for the application in a storage device. The remote server may process the stored instructions using circuitry (e.g., control circuitry 1028) and/or generate displays. User device 1018A may receive the displays generated by the remote server and may display the content of the displays locally via display 1234. This way, the processing of the instructions is performed remotely (e.g., by transmitter 1002) while the resulting displays, such as the display windows described elsewhere herein, are provided locally on the client device 1018A. Client device 1018A may receive inputs from the user via input circuitry 1016 and transmit those inputs to the remote server for processing and generating the corresponding displays. Alternatively, client device 1018 may receive inputs from the user via input circuitry 1016 and process and display the received inputs locally, by control circuitry 1028 and display 1034, respectively.

Transmitter 1002 and user devices 1018A-N may transmit and receive content and data such as segments of media content via communication networks 1014A-N. For example, transmitter 1002 may be a base station configured to multicast a media stream, and client devices 1018A-N may be smart phones configured to download and display the media stream from the transmitter 1002. Control circuitry 1020, 1028 may send and receive commands, requests, and other suitable data through communication networks 1014A-N using transceiver circuitry 1060, 1062, respectively (also referred to as input/output circuitry). Control circuitry 1020, 1028 may communicate directly with each other using transceiver circuitry 1060, 1062, respectively, avoiding communication networks 1014A-N.

It is understood that user device 1018A is not limited to the embodiments and methods shown and described herein. In non-limiting examples, the user device 1018 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1020 and/or 1028 may be based on any suitable processing circuitry such as processing circuitry 1026 and/or 1040, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1020 and/or control circuitry 1028 are configured to implement a primary and/or supplemental multicast system, such as systems, or parts thereof, that perform various functions and processes described herein.

User device 1018A receives a user input 1004 at input circuitry 1016. For example, user device 1018 may receive a user input like a user swipe or user touch. In some embodiments, user device 1018A is a media device (or player), with the capability to access media content. User input 1004 may be received from a user selection-capturing interface that is separate from device 1018, such as a remote-control device, trackpad, or any other suitable user movement sensitive or capture devices, or as part of device 1018, such as a touchscreen of display 1034. Transmission of user input 1004 to user device 1018 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, 5G, or any other suitable wireless transmission protocol. Input circuitry 1016 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, 5G or other wireless transmission protocols.

Processing circuitry 1040 may receive input 1004 from input circuitry 1016. Processing circuitry 1040 may convert or translate the received user input 1004 that may be in the form of gestures or movement to digital signals. In some embodiments, input circuitry 1016 performs the translation to digital signals. In some embodiments, processing circuitry 1040 (or processing circuitry 1026, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
   joining, by a first device, a primary multicast of media content from a second device via a first network, wherein the media content comprises one or more segments, each segment comprising a first subset of frames and a second subset of frames;
   receiving, by the first device, an identification of a proximate third device that is joined to the primary multicast of the media content from the second device;
   joining, by the first device, a supplemental multicast of the media content from the third device, wherein the supplemental multicast includes less than all segments of the primary multicast and operates using device-to-device communication; and
   in response to determining that the first device has failed to receive a first segment of the media content via the primary multicast:
      retrieving the first subset of frames of the first segment from the third device via the supplemental multicast using device-to-device communication; and
      retrieving the second subset of frames of the first segment from a fourth device using device-to-device communication, wherein the fourth device is joined to the primary multicast of media content from the second device.

2. The method of claim 1, wherein the second device comprises a base station, wherein the primary multicast comprises a first coverage area, and wherein the supplemental multicast comprises a second coverage area that is less than the first coverage area and is encompassed within the first coverage area.

3. The method of claim 1, wherein receiving the identification of the proximate third device comprises:
   receiving, by the first device from the second device, a service announcement including a list of devices joined to the primary multicast ranked based on respective signal strength or battery life, wherein the proximate third device is the best ranked device on the list of devices.

4. The method of claim 1, wherein receiving the identification of the proximate third device comprises:
   receiving, by the first device in response to joining the primary multicast, a service announcement transmitted via unicast by the second device, wherein the service announcement includes a list of devices joined to the primary multicast ranked based on (a) a location of the first device and (b) the respective locations of the devices in the list of devices joined to the primary unicast.

5. The method of claim 1, further comprising:
   in response to determining that the first device has failed to receive a second segment of the media content via the primary multicast, retrieving the second segment from the third device via the supplemental multicast.

6. The method of claim 5, wherein the first device and the third device each comprise an HTTP proxy server configured to store segments of the media content, and wherein retrieving the second segment from the third device via the supplemental multicast comprises:
   transmitting a request from the first device to the third device to transmit the second segment stored in the HTTP proxy server of the third device;
   receiving, by the first device from the HTTP proxy server of the third device, the second segment of the media content; and
   storing, in the HTTP proxy server of the first device, the second segment of the media content.

7. The method of claim 1, the method further comprising:
   joining, by a fifth device, the primary multicast;
   receiving, by the fifth device from the third device via the supplemental multicast, a first set of segments of the media content, wherein the fifth device receives the first set of media segments of the media content before receiving any segment of the media content from the second device via the primary multicast; and after receiving the first set of segments of the media content from the third device via the supplemental multicast, receiving a second set of segments of the media content from the second device via the primary multicast.

8. The method of claim 1, further comprising:
joining, by a fifth device, the primary multicast and the supplemental multicast; and
in response to determining that (a) the first device has failed to receive a second segment of the media content via the primary multicast, and (b) the fifth device has failed to receive the second segment of the media content via the primary multicast, simultaneously:
retrieving, by the first device from the third device via the supplemental multicast, the second segment of the media content; and
retrieving, by the fifth device from the third device via the supplemental multicast, the second segment of the media content.

9. The method of claim 1, further comprising:
in response to determining that more than a threshold number of devices joined to the primary multicast have failed to receive one or more segments of the media content from the second device via the primary multicast, modifying a segment size of the segments of the media content transmitted via the primary multicast.

10. A system comprising:
control circuitry configured to:
join, by a first device, a primary multicast of media content from a second device via a first network, wherein the media content comprises one or more segments, each segment comprising a first subset of frames and a second subset of frames; and
input/output circuitry configured to:
receive, by the first device, an identification of a proximate third device that is joined to the primary multicast of the media content from the second device;
join, by the first device, a supplemental multicast of the media content from the third device, wherein the supplemental multicast includes less than all segments of the primary multicast, and operates using device-to-device communication; and
in response to determining that the first device has failed to receive a first segment of the media content via the primary multicast:
retrieve the first subset of frames of the first segment from the third device via the supplemental multicast using device-to-device communication; and
retrieve the second subset of frames of the first segment from a fourth device using device-to-device communication, wherein the fourth device is joined to the primary multicast of media content from the second device.

11. The system of claim 10, wherein the second device comprises a base station, wherein the primary multicast comprises a first coverage area, and wherein the supplemental multicast comprises a second coverage area that is less than the first coverage area and is encompassed within the first coverage area.

12. The system of claim 10, wherein the input/output circuitry is further configured to receive the identification of the proximate third device by:
receiving, by the first device from the second device, a service announcement including a list of devices joined to the primary multicast ranked based on respective signal strength or battery life, wherein the proximate third device is the best ranked device on the list of devices.

13. The system of claim 10, wherein the input/output circuitry is further configured to receive the identification of the proximate third device by:
receiving, by the first device in response to joining the primary multicast, a service announcement transmitted via unicast by the second device, wherein the service announcement includes a list of devices joined to the primary multicast ranked based on (a) a location of the first device and (b) the respective locations of the devices in the list of devices joined to the primary unicast.

14. The system of claim 10, wherein the control circuitry is further configured to:
in response to determining that the first device has failed to receive a second segment of the media content via the primary multicast, retrieve the second segment from the third device via the supplemental multicast.

15. The system of claim 14, wherein the first device and the third device each comprise an HTTP proxy server configured to store segments of the media content, and wherein the control circuitry retrieving the second segment from the third device via the supplemental multicast further comprises:
transmitting a request from the first device to the third device to transmit the second segment stored in the HTTP proxy server of the third device;
receiving, by the first device from the HTTP proxy server of the third device, the second segment of the media content; and
storing, in the HTTP proxy server of the first device, the second segment of the media content.

16. The system of claim 10, wherein the first subset of frames comprises one or more I-frames, and the second subset of frames comprises one or more P- or B-frames, wherein the control circuitry is further configured to:
in response to determining that the first device has failed to receive the first segment of the media content via the primary multicast:
retrieve the one or more I-frames of the first segment from the third device via the supplemental multicast; and
retrieve the one or more P- or B-frames of the first segment from the fourth device.

17. The system of claim 10, wherein the control circuitry is further configured to:
join, by a fifth device, the primary multicast;
receive, by the fifth device from the third device via the supplemental multicast, a first set of segments of the media content, wherein the fifth device receives the first set of media segments of the media content before receiving any segment of the media content from the second device via the primary multicast; and
after receiving the first set of segments of the media content from the third device via the supplemental multicast, receive a second set of segments of the media content from the second device via the primary multicast.

18. The system of claim 10, wherein the control circuitry is further configured to:
join, by a fifth device, the primary multicast and the supplemental multicast; and
in response to determining that (a) the first device has failed to receive a second segment of the media content via the primary multicast, and (b) the fifth device has failed to receive the second segment of the media content via the primary multicast, simultaneously:
  retrieve, by the first device from the third device via the supplemental multicast, the second segment of the media content; and
  retrieve, by the fourth device from the third device via the supplemental multicast, the second segment of the media content.

19. The system of claim 10, wherein the control circuitry is further configured to:
  in response to determining that more than a threshold number of devices joined to the primary multicast have failed to receive one or more segments of the media content from the second device via the primary multicast, modify a segment size of the segments of the media content transmitted via the primary multicast.

20. A method comprising:
  joining, by a first device, a primary multicast of media content from a second device via a first network, wherein the media content comprises one or more segments, each segment comprising one or more I-frames and one or more P- of B-frames;
  receiving, by the first device, an identification of a proximate third device that is joined to the primary multicast of the media content from the second device;
  joining, by the first device, a supplemental multicast of the media content from the third device, wherein the supplemental multicast includes less than all segments of the primary multicast and operates using device-to-device communication;
  in response to determining that the first device has failed to receive a first segment of the media content via the primary multicast:
    retrieving the one or more I-frames of the first segment from the third device via the supplemental multicast using device-to-device communication; and
    retrieving the one or more P- or B-frames of the first segment from a fourth device using device-to-device communication, wherein the fourth device is joined to the primary multicast of media content from the second device.

* * * * *